United States Patent
Gas et al.

(10) Patent No.: US 12,489,325 B2
(45) Date of Patent: Dec. 2, 2025

(54) COIL INTENDED TO BE INSERTED IN THE NOTCHES OF A STATOR OF A ROTATING ELECTRICAL MACHINE

(71) Applicants: NIDEC PSA EMOTORS, Carrieres sous Poissy (FR); SKYAZUR, Tourcoing (FR)

(72) Inventors: Olivier Gas, Versailles (FR); Jacques Saint Michel, Angouleme (FR); Xavier Jannot, Angouleme (FR); Nicolas Langlard, Loos (FR); Sebastien Desurmont, Marq-en-Baroeul (FR)

(73) Assignees: NIDEC PSA EMOTORS, Carrieres sous Poissy (FR); SKYAZUR, Tourcoing (FR)

( * ) Notice: Subject to any disclaimer, the term of this patent is extended or adjusted under 35 U.S.C. 154(b) by 399 days.

(21) Appl. No.: 18/256,813

(22) PCT Filed: Dec. 16, 2021

(86) PCT No.: PCT/FR2021/052353
§ 371 (c)(1),
(2) Date: Jun. 9, 2023

(87) PCT Pub. No.: WO2022/129796
PCT Pub. Date: Jun. 23, 2022

(65) Prior Publication Data
US 2024/0030757 A1  Jan. 25, 2024

(30) Foreign Application Priority Data

Dec. 17, 2020 (FR) .................................... 2013445
Dec. 17, 2020 (FR) .................................... 2013503
Dec. 17, 2020 (FR) .................................... 2013543

(51) Int. Cl.
*H02K 3/28* (2006.01)
*H02K 1/16* (2006.01)
*H02K 15/0421* (2025.01)

(52) U.S. Cl.
CPC .................. *H02K 1/16* (2013.01); *H02K 3/28* (2013.01); *H02K 15/0421* (2013.01)

(58) Field of Classification Search
CPC ........................................................ H02K 3/28
(Continued)

(56) References Cited

U.S. PATENT DOCUMENTS 6,326,715 B1 * 12/2001 Asao ..................... H02K 3/12 310/71
6,501,205 B1 * 12/2002 Asao ..................... H02K 3/12 310/184

(Continued)

FOREIGN PATENT DOCUMENTS

DE 112013005097 T5 8/2015
EP 2562917 A1 2/2013

(Continued)

OTHER PUBLICATIONS

International Search Report for PCT/FR2021/052353 mailed Mar. 9, 2022.

(Continued)

*Primary Examiner* — Alexander Talpalatski
(74) *Attorney, Agent, or Firm* — Sandberg Phoenix & von Gontard, PC

(57) ABSTRACT

The invention relates to a coil intended to be inserted in into a first and a second slot of a stator, the coil being wound in a plurality of successive turns, each turn comprising:—a first half-turn comprising a first slot portion configured to be inserted in into the first slot of the stator,—a second half-turn comprising a second slot portion configured to be inserted in (Continued)

into the second slot of the stator, the second half-turns each being connected to the first half-turn of the same turn and to the first half-turn of the next turn by junction portions on each side of the first and second slot portions, the junction portions of the coil stacking along at least two juxtaposed heads extending in mutually parallel junction planes.

19 Claims, 17 Drawing Sheets

(58) Field of Classification Search
USPC .......................................................... 310/179
See application file for complete search history.

(56) References Cited

U.S. PATENT DOCUMENTS

| | | | | |
|---|---|---|---|---|
| 6,661,146 | B2* | 12/2003 | Oohashi | ................... H02K 3/50 |
| | | | | 310/179 |
| 7,088,026 | B2* | 8/2006 | Gorohata | ................. H02K 3/28 |
| | | | | 310/201 |
| 8,587,177 | B2* | 11/2013 | Kitamura | ................. H02K 3/12 |
| | | | | 310/179 |
| 10,476,337 | B2 | 11/2019 | Koga et al. | |
| 2017/0279324 | A1* | 9/2017 | Röer | ........................ H02K 3/28 |
| 2018/0069446 | A1* | 3/2018 | Hino | ........................ H02K 1/16 |

FOREIGN PATENT DOCUMENTS

| | | | |
|---|---|---|---|
| EP | 3197020 | B1 | 7/2019 |
| EP | 2416471 | B1 | 2/2020 |
| JP | S62293958 | A | 12/1987 |
| JP | 2001045688 | A | 2/2001 |
| JP | 2006340583 | A | 12/2006 |
| JP | 2011097723 | A | 5/2011 |
| JP | 2015126636 | A | 7/2015 |

OTHER PUBLICATIONS

Corresponding to Written Opinion for PCT/FR2021/052353 mailed Mar. 9, 2022.

* cited by examiner

COIL INTENDED TO BE INSERTED IN THE NOTCHES OF A STATOR OF A ROTATING ELECTRICAL MACHINE

This application is the US National Stage under 35 USC § 371 of International Application No. PCT/FR2021/052353, filed Dec. 16, 2021, which claims priorities of French App. Nos. 2013503, filed on Dec. 17, 2020, U.S. Pat. No. 2,013,543, filed on Dec. 17, 2020 and U.S. Pat. No. 2,013,445, filed on Dec. 17, 2020, the contents (texts, drawings and claims) of all said applications being incorporated herein by reference.

TECHNICAL FIELD

Coils intended to be inserted in the slots of a stator of a rotating electrical machine are disclosed herein. The associated winding, the stator and the corresponding rotating electrical machine are also disclosed, as are methods for manufacturing such windings.

More particularly, synchronous or asynchronous AC machines are disclosed. In particular, traction or drive machines for electric motor vehicles (battery electric vehicles) and/or hybrid motor vehicles (hybrid electric vehicles—plug-in hybrid electric vehicles), such as private cars, vans, trucks or buses are disclosed. Rotary electric machines for industrial and/or power generation applications, in particular naval, aerospace or wind turbine applications are also disclosed.

Usually, the coils of electrical machines are formed by winding an electric wire according to a plurality of identical turns, the coils then being inserted in the slots of the machine, taking the shape necessary to fill the slots by bending with insertion. In one variant, the coils are formed by winding an electrical wire in turns on a predetermined shape template, then inserted in the slots while substantially maintaining the shape of the template.

Patent applications EP2416471, JP2011097723, EP2562917, EP3197020 and U.S. Ser. No. 10/476,337 disclose stators comprising coils formed by winding an electric wire according to a plurality of identical turns of substantially hexagonal shape. The coils are configured to be inserted in two slots of the stator spaced apart from one another by a plurality of slots.

There is a need to benefit from coils for a rotating electrical machine stator that are easy to assemble and allow effective filling of the slots, while ensuring satisfactory electromagnetic performance. There is also a need to further improve the stators of electrical machines and in particular to reduce torque ripple and AC Joule loss by induced currents, vibrations and electromagnetic noise.

There is also a need to have a method for manufacturing coils that allow the formation of coils with a satisfactory filling rate of the slots, allow rapid manufacturing of the coils, limit the quantity of electrical conductors used and can be effectively cooled.

SUMMARY

Coil

According to one aspect, the disclosed machine comprises a coil intended to be bent to be inserted into a first and a second slot of a stator of a rotating electrical machine, the coil being wound in a plurality of successive turns, each coil comprising:

a first half-turn having a first slot portion configured to be inserted in the first slot of the stator, a second half-turn having a second slot portion configured to be inserted in the second slot of the stator, the innermost first and second slot portions of the coil having their innermost surfaces extending along the same median plane of the coil, the coil being entirely comprised between two external planes parallel to the median plane of the coil and defined by the surfaces of the first and second slot portions that are the outermost of the coil furthest from the median plane of the coil, the first slot portions and the second slot portions being stacked in an identical order starting from the median plane of the coil toward the external planes.

The term "median plane" is understood to mean the plane containing the longitudinal axis of the coil and extending in the width of the coil. The term "transverse plane" is understood to mean the plane containing the longitudinal axis of the coil and extending in the thickness of the coil.

The term "the first slot portions and the second slot portions being stacked in an identical order starting from the median plane of the coil toward the external planes" is understood to mean that, if the first slot portions taken from the first turn to the last turn of the winding are stacked from the median plane toward one of the external planes, then the second slot portions taken from the first turn to the last turn of the winding are also stacked from the median plane toward one of the external planes, and vice versa. Thus, it is understood that if the first slot portion of the first turn of the coil is the innermost of the coil, the second slot portion of this same first turn is the innermost of the coil also and vice versa.

As a result, when the slot portions are inserted in the corresponding slots, the first slot portions of the successive turns are configured to be arranged in the first slot of the stator in a radially inverse order of the second slot portions of the successive turns in the second slot. That is, if the first slot portion of the first turn of the coil is radially innermost in the first slot of the stator, the second portion of this same turn is radially outermost in the second slot of the stator and vice versa.

Each coil comprising several turns, a reduction in losses by induced currents, or Joule AC losses, is achieved, which is particularly advantageous when the operating speed is high. The heat transfer to the cold source is also facilitated.

The inversion of the order of the slot portions in the first and second slots, also called "transposition", in particular makes it possible to minimize the circulation currents between slot portions of the same coil in each of the first and second slots.

The expression "the innermost of the coil" is understood to mean those closest to the median plane of the coil.

The fact that the innermost first and second slot portions of the coil have their innermost surfaces extending along the same median plane makes it possible to have a coil that is compact perpendicular to the median plane of the coil. In addition, such compactness allows better filling of the slots of the stator by allowing the first and second slot portions inserted in a slot to be very close or even in contact with one another. This improves machine performance.

"The coil being entirely comprised between two external planes parallel to the median plane of the coil and defined by the surfaces of the first and second slot portions that are the outermost of the coil furthest from the median plane of the coil" means that the maximum thickness of the coil corresponds to the thickness of the coil at the slot portions.

The fact that the coils extend entirely between two external planes defined by surfaces of the outermost slot portions makes it possible to have compact coils in the radial direction at the coil ends, that is to say the portions that extend out of the slots after the insertion of the coils into the slots. This also makes it possible to facilitate the manufacture of the electrical machine by limiting the portions outside the slots to having a radial form factor outside the slots greater than the radial form factor of the slots.

When the coil is inserted in the slots of the stator or before it is inserted in the slots of the stator, it is bent (or curved) to adopt the curvature of the stator and allow the insertion of the slot portions in two slots of the stator that are spaced apart. The median plane becomes a median cylinder of the coil and the external planes become external cylinders of the same central axis as the median cylinder but of different radii. The coil may have an angular extent in the stator of between 20° and 180°, better still between 50° and 80°, preferably substantially equal to 65°.

Preferably, the first and second slot portions are of the same length, in particular substantially the length of the slots of the stator.

Preferably, the first and second half-turns are of the same length.

Preferably, the first and second slot portions are rectilinear.

The coil is preferentially formed from one or more conducting wires, preferably a single conducting wire. Preferably, the conducting wire(s) are, in cross-section, of circular shape, or of polygonal shape, in particular with rounded edges, preferentially of rectangular shape, among other possible shapes. Preferably, the conducting wire has a rectangular cross-section. Preferably, the first slot portions are stacked on one another by being in contact with one another on their widest face, otherwise called the flat face, and the second slot portions are also stacked on one another by being in contact with one another by their flat face.

Preferably, the coil is a winding of a conducting wire, whereof one of the first or last turns is the turn closest to the median plane P and the other of the first or last turn is the turn furthest from the median plane P.

Preferably, the conducting wire of the coil is electrically insulated by an insulating coating, in particular an enamel.

The coil is preferably of substantially hexagonal shape, in particular with two opposite sides formed by the first and second slot portions longer than the others, in particular at least twice as long as the other sides of the hexagon. Alternatively, the first and second slot portions are shorter than the other sides of the hexagon.

Preferably, the first and second half-turns each extend along a half-turn plane, in particular parallel to the flat face of the conducting wire, the half-turn planes of the first and second half-turns being parallel to one another and parallel to the median plane of the coil. Preferably, the half-turn planes of the first half-turns all extend on the same side of the median plane of the coil and the half-turn planes of the second half-turns all extend from the other side of the median plane of the coil.

Preferably, the second half-turns are each connected to the first half-turn of the same turn and to the first half-turn of the next turn by junction portions.

Preferably, the first and second half-turns each comprise two coil portions extending on either side of the respective first and second slot portions. The coil end portions are connected to the junction portions between the first and second half-turns and intended to extend out of the first and second slots. The coil end portions are, preferably, rectilinear before insertion of the slot portions in the slots of the stator and bent just before or during the insertion of the slot portions in the slots of the stator to follow the curvature of the stator. Preferably, the coil portions extend in the same extension plane parallel to the median plane of the coil than the corresponding first or second slot portion. The coil end portions can form a non-flat angle with the corresponding first or second slot portion. The angle between the first or the second slot portion and the coil end portions may be between 90° and 150°, preferably being on the order of 120°.

Preferably, the junction portions between the first and second half-turns and a portion of the first and second half-turns, in particular the coil end portions of the half-turns, form two coil ends of the coil extending on either side of the stator when the coil is inserted in the stator.

Preferably, the consecutive junction portions on the same side of the slot portions extend on different heads.

Preferably, each junction portion is a loop portion extending between the first and the second half-turn that it connects, in particular between the coil end portions of the first and the second half-turn that it connects. Preferably, the innermost junction portion of the coil forms a substantially complete loop, the other junction portions preferentially forming loop portions with an angular extent substantially equal to 180°.

From the two sides of the first and second slot portions, the junction portions of the coil can all be stacked along the same junction plane by each being superposed on one another, in particular on the flat face of the conducting wire. Thus, the junction portions form a single head at each end of the coil and are of increasing length from the center of the coil to the outside of the coil. Preferably, the heads of the two ends of the coil extend along the same junction plane, in particular perpendicular to the median plane of the coil.

Alternatively, on each side of the first and second slot portions, the junction portions of the coil are stacked in at least two juxtaposed heads extending according to junction planes parallel to one another, the junction portions being superposed on one another, in particular on the flat face of the conducting wire, alternatively on both of the heads. The two junction planes are preferably offset laterally by a distance substantially equal to the width of the flat face of the conducting wire so that the two adjacent heads are laterally contiguous. In particular, this makes it possible to reduce the radial size of the coil ends in order to facilitate the manufacture of the electrical machine. Preferably, the junction planes are perpendicular to the median plane of the coil.

The first slot portions can be superposed along a single column extending perpendicular to the median plane of the coil, that is to say configured to extend radially into the first slot, and the second slot portions can be superposed in a single column perpendicular to the median plane, that is to say configured to extend radially into the second slot. Preferably, the width of the wire of the first and of the second slot portion is substantially equal to the width of the first and of the second slot, respectively, wherein it is inserted.

As a variant, the first slot portions are superposed according to several, in particular two, juxtaposed columns extending perpendicular to the median plane, and the second slot portions are also superposed according to several, in particular two, juxtaposed columns extending perpendicular to the median plane. In this case, preferably, the junction portions on one side of the slot portions are stacked in as many heads as there are juxtaposed columns of the junction portions, and the junction portions on the other side of the slot portions are stacked in a number of juxtaposed heads corresponding to the number of columns of the slot portions plus one, the heads extending along junction planes parallel to one another and preferentially perpendicular to the median plane of the coil.

The first slot portions of the consecutive turns can extend over different columns and the second slot portions of the consecutive turns can extend over different columns.

The coil can be configured to be arranged in the slots of the stator in a concentrated or distributed manner.

"Concentrated" is understood to mean that the coil is wound around a single tooth and the first and second slots are adjacent.

"Distributed" means that the first and second slots are not adjacent.

Preferably, the coil is configured to be arranged in the first and the second slot in a distributed manner.

According to another aspect, the disclosed machine also comprises a coil intended to be inserted in a first and a second slot of a stator of a rotating electrical machine, the coil being wound in a plurality of successive turns, each coil comprising:
 a first half-turn comprising a first slot portion configured to be inserted in the first slot of the stator,
 a second half-turn comprising a second slot portion configured to be inserted in the second slot of the stator,
 wherein the second half-turns are each connected to the first half-turn of the same turn and to the first half-turn of the next turn by junction portions, on each side of the first and second slot portions, and the junction portions of the coil are stacked in at least two juxtaposed heads extending according to junction planes parallel to one another.

The fact that the junction portions of the coil are stacked in at least two juxtaposed heads in particular makes it possible to reduce the radial size of the coil ends, which facilitates the manufacture of the machine.

The term "median plane" is understood to mean the plane containing the longitudinal axis of the coil and extending in the width of the coil. The term "transverse plane" is understood to mean the plane containing the longitudinal axis of the coil and extending in the thickness of the coil.

Preferably, the consecutive junction portions on the same side of the slot portions extend on different heads.

The two junction planes are preferably offset laterally by a distance substantially equal to the width of the flat face of the conducting wire so that the two adjacent heads are laterally contiguous.

Preferably, before insertion into the stator, the first slot portion and the innermost second slot portion of the coil have their innermost surface extending along the same median plane of the coil. This makes it possible to have a coil that is compact perpendicular to the median plane. In addition, such compactness allows better filling of the slots of the stator by allowing the first and second slot portions inserted in a slot to be in contact with one another. This improves cooling.

Alternatively, the innermost first and second slot portions of the coil have their innermost surfaces extending in two different planes spaced apart radially by a non-zero distance.

The expression "the innermost of the coil" is understood to mean those closest to the median plane of the coil.

Preferably, the coil is entirely comprised between two external planes parallel to the median plane and defined by the surfaces furthest from the median plane of the outermost first and second slot portions of the coil. The fact that the coils extend entirely between two planes defined by surfaces of outermost slot portions parallel to the median plane makes it possible to have coils that are compact in the radial direction at the coil ends, that is to say the portions that extend out of the slots after the insertion of the coils in the slots.

"The coil is entirely comprised between two external planes parallel to the median plane and defined by the surfaces furthest from the median plane of the outermost first and second slot portions of the coil" means that the maximum thickness of the coil corresponds to the thickness of the coil at the slot portions.

Preferably, the first slot portions and the second slot portions are stacked in an identical order starting from the median plane of the coil toward the external planes.

The term "the first slot portions and the second slot portions being stacked in an identical order starting from the median plane of the coil toward the external planes" is understood to mean that, if the first slot portions taken from the first turn to the last turn of the winding are stacked from the median plane toward one of the external planes, then the second slot portions taken from the first turn to the last turn of the winding are also stacked from the median plane toward one of the external planes, and vice versa. Thus, it is understood that if the first slot portion of the first turn of the coil is the innermost of the coil, the second slot portion of this same turn is the innermost of the coil and vice versa.

As a result, when the slot portions are inserted in the corresponding slots, the first slot portions of the successive turns are configured to be arranged in the first slot of the stator in a radially inverse order of the second slot portions of the successive turns in the second slot. That is, if the first slot portion of the first turn of the coil is radially innermost in the first slot of the stator, the second portion of this same turn is radially outermost in the second slot of the stator and vice versa.

Each coil comprising several turns, a reduction in losses by induced currents, or Joule AC losses, is achieved, which is particularly advantageous when the operating speed is high. The heat transfer to the cold source is also facilitated.

The inversion of the order of the slot portions in the first and second slots, also called "transposition", in particular makes it possible to minimize the circulation currents between slot portions of the same coil in each of the first and second slots.

Preferably, the junction planes are perpendicular to the median plane of the coil.

Preferably, the first and second half-turns each comprise two coil portions extending on either side of the respective first and second slot portions. The coil end portions are connected to the junction portions between the first and second half-turns and intended to extend out of the first and second slot. The coil end portions are preferably rectilinear before insertion of the slot portions in the slots of the stator and curved after insertion to adopt the curvature of the stator. Preferably, the coil portions extend in the same plane as the corresponding first or second slot portion. The coil end portions can form a non-flat angle with the corresponding first or second slot portion. The angle between the first or the second slot portion and the coil end portions may be between 90° and 150°, preferably being on the order of 120°.

Preferably, the junction portions between the first and second half-turns and a portion of the first and second half-turns, in particular the coil end portions of the half-turns, form two coil ends of the coil extending on either side of the stator when the coil is inserted in the stator.

Preferably, each junction portion is a loop portion extending between the first and the second half-turn that it connects, in particular between the coil end portions of the first and the second half-turn that it connects. Preferably, the innermost junction portion of the coil forms a substantially complete loop, the other junction portions preferentially forming loop portions with an angular extent substantially equal to 180°. Alternatively, all the junction portions form loop portions with an angular extent substantially equal to 180°.

When the coil is inserted in the slots of the stator, it is deformed to adopt the curvature of the stator. The median plane becomes a median cylinder of the coil and the external planes become external cylinders of the same central axis as the median cylinder but of different radii. The coil may have an angular extent in the stator of between 20° and 180°, better still between 50° and 80°, preferably substantially equal to 65°.

Preferably, the first and second slot portions are of the same length.

Preferably, the first and second half-turns are of the same length.

The coil is preferably of substantially hexagonal shape, in particular with two opposite sides formed by the first and second slot portions longer than the others, in particular at least twice as long as the other sides of the hexagon. Alternatively, the first and second slot portions are shorter than the other sides of the hexagon.

The coil is preferentially formed from one or more conducting wires, preferably a single conducting wire. Preferably, the conducting wire(s) are, in cross-section, of circular shape, or of polygonal shape, in particular with rounded edges, preferentially of rectangular shape, among other possible shapes. Preferably, the conducting wire has a rectangular cross-section. Preferably, the first slot portions are stacked on one another by being in contact with one another on their widest face, otherwise called the flat face, and the second slot portions are also stacked on one another by being in contact with one another by their flat face.

Preferably, the coil is a winding of a conducting wire, one of the first or last turn whereof is the turn closest to the median plane P and the other of the first or last turn is the turn furthest from the median plane P.

Preferably, the conducting wire of the coil is electrically insulated by an insulating coating, in particular an enamel.

Preferably, the first and second slot portions are rectilinear.

Preferably, the first and second half-turns each extend along a half-turn plane, in particular parallel to the flat face of the conducting wire, the half-turn planes of the first and second half-turns being parallel to one another and parallel to the median plane of the coil. Preferably, the half-turn planes of the first half-turns all extend on the same side of the median plane of the coil and the half-turn planes of the second half-turns all extend from the other side of the median plane of the coil.

The first slot portions can be superposed along a single column perpendicular to the median plane of the coil, that is to say configured to extend radially into the first slot, and the second slot portions can be superposed in a single column perpendicular to the median plane, that is to say configured to extend radially into the second slot. Preferably, the width of the wire of the first and of the second slot portion is substantially equal to the width of the first and of the second slot, respectively, wherein it is inserted.

As a variant, the first slot portions are superposed according to several, in particular two, juxtaposed columns extending perpendicular to the median plane, and the second slot portions are also superposed according to several, in particular two, juxtaposed columns extending perpendicular to the median plane. This makes it possible to have a larger number of turns in the slots, which improves the performance of the machine.

In this case, preferably, the junction portions on one side of the slot portions are stacked in as many heads as there are juxtaposed columns of the junction portions, and the junction portions on the other side of the slot portions are stacked in a number of juxtaposed heads corresponding to the number of columns of the slot portions plus one, the heads extending along junction planes parallel to one another and preferentially perpendicular to the median plane of the coil.

The first slot portions of the consecutive turns can extend over different columns and the second slot portions of the consecutive turns can extend over different columns.

The coil can be configured to be arranged in the slots of the stator in a concentrated or distributed manner.

"Concentrated" is understood to mean that the coil is wound around a single tooth and the first and second slots are adjacent.

"Distributed" means that the first and second slots are not adjacent.

Preferably, the coil is configured to be arranged in the first and the second slot
in a distributed manner.

According to another one of its aspects, the disclosed machine also comprises a coil intended to be bent to be inserted in a first and a second slot of a stator of a rotating electrical machine, the coil being wound in a plurality of successive turns, each coil comprising:

a first half-turn having a first slot portion configured to be inserted in the first slot of the stator, a second half-turn having a second slot portion configured to be inserted in the second slot of the stator, the first slot portions being stacked in one or more columns each configured to extend radially into the first slot of the stator, and the second slot portions are stacked in a same number of columns each configured to extend radially into the second slot of the stator, the first slot portions and the second slot portions being stacked in an identical order moving from a median plane of the coil toward the external planes, the second half-turns each being connected to the first half-turn of the same turn and to the first half-turn of the next turn by junction portions, the junction portions extending from one of the sides of the first and second slot portions that are stacked in a number of juxtaposed heads strictly greater than the number of columns of the first and second slot portions.

The term "the first slot portions and the second slot portions being stacked in an identical order starting from a median plane of the coil toward the external planes" is understood to mean that the first slot portions taken from the first turn to the last turn of the winding are stacked from the median plane toward one of the external planes, then the second slot portions taken from the first turn to the last turn of the winding are also stacked from the median plane toward one of the external planes, and vice versa. Thus, it is understood that if the first slot portion of the first turn of the coil is the innermost of the coil, the second slot portion of this same turn is the innermost of the coil and vice versa.

The term "median plane of the coil" is understood to mean the plane containing the longitudinal axis of the coil and extending in the width of the coil. This plane is normal to the winding axis of the turns. After bending, it forms a lateral cylindrical portion. This median plane can be parallel to the extension planes of the first and second half-turns. The term "transverse plane" is understood to mean the plane containing the longitudinal axis of the coil and extending in the thickness of the coil Each coil comprising several turns, a reduction in losses by induced currents, or Joule AC losses, is achieved, which is particularly advantageous when the operating speed is high. The heat transfer to the cold source is also facilitated.

The inversion of the order of the slot portions in the first and second slots, also called "transposition", in particular makes it possible to minimize the circulation currents between slot portions of the same coil in each of the first and second slots.

The fact that the junction portions extend from one of the sides of the first and second slot portions that are stacked in a number of juxtaposed heads strictly greater than the number of columns of the first and second slot portions makes it possible in particular to reduce the radial form factor of at least one of the coil ends, which facilitates the manufacture of the electrical machine. Such reduced form factor allows the fitting of a part to close the slots after inserting the coils, in particular when the coils are inserted in a stator having a ring and a yoke as described below.

The innermost first and second slot portions of the coil can have their innermost surfaces extending along the same median plane of the coil.

The coil can be entirely comprised between two external planes parallel to the median plane of the coil and defined by the surfaces of the first and second slot portions that are the outermost of the coil furthest from the median plane of the coil.

The first slot portions and the second slot portions may be stacked in an identical order starting from the median plane of the coil toward the external planes.

Preferably, the features previously described in connection with the other aspects apply to this aspect of the disclosed machine independently or in combination.

Preferably, the first and second slot portions are of the same length, in particular substantially the length of the slots of the stator.

Preferably, the first and second half-turns are of the same length.

Preferably, the first and second slot portions are rectilinear.

The coil is preferentially formed from one or more conducting wires, preferably a single conducting wire. Preferably, the conducting wire(s) are, in cross-section, of circular shape, or of polygonal shape, in particular with rounded edges, preferentially of rectangular shape, among other possible shapes.

Preferably, the conducting wire has a rectangular cross-section. Preferably, the first slot portions are stacked on one another by being in contact with one another on their widest face, otherwise called the flat face, and the second slot portions are also stacked on one another by being in contact with one another by their flat face.

Preferably, the coil is a winding of a conducting wire, one of the first or last turn whereof is the turn closest to the median plane P and the other of the first or last turn is the turn furthest from the median plane P.

Preferably, the conducting wire of the coil is electrically insulated by an insulating coating, in particular an enamel.

The coil is preferably of substantially hexagonal shape, in particular with two opposite sides formed by the first and second slot portions longer than the others, in particular at least twice as long as the other sides of the hexagon. Alternatively, the first and second slot portions are shorter than the other sides of the hexagon.

Preferably, the first and second half-turns each extend along a half-turn plane, in particular parallel to the flat face of the conducting wire, the half-turn planes of the first and second half-turns being parallel to one another and parallel to the median plane of the coil. Preferably, the half-turn planes of the first half-turns all extend on the same side of the median plane of the coil and the half-turn planes of the second half-turns all extend from the other side of the median plane of the coil.

Preferably, the first and second half-turns each comprise two coil portions extending on either side of the respective first and second slot portions. The coil end portions are connected to the junction portions between the first and second half-turns and intended to extend out of the first and second slots. The coil end portions are, preferably, rectilinear before insertion of the slot portions into the slots of the stator and bent just before or during the insertion of the slot portions into the slots of the stator to follow the curvature of the stator. Preferably, the coil portions extend in the same extension plane parallel to the median plane of the coil than the corresponding first or second slot portion. The coil end portions can form a non-flat angle with the corresponding first or second slot portion. The angle between the first or the second slot portion and the coil end portions may be between 90° and 150°, preferably being on the order of 120°.

Preferably, the junction portions between the first and second half-turns and a portion of the first and second half-turns, in particular the coil end portions of the half-turns, form two coil ends of the coil extending on either side of the stator when the coil is inserted in the stator.

Preferably, each junction portion head is a loop portion extending between the first and the second half-turn that it connects, in particular between the coil end portions of the first and the second half-turn that it connects. Preferably, the innermost junction portion of the coil forms a substantially complete loop, the other junction portions preferentially forming loop portions with an angular extent substantially equal to 180°.

From one of the sides of the first and second slot portions, the junction portions of the coil can all be stacked along the same junction plane by each being superposed on one another, in particular on the flat face of the conducting wire. Thus, the junction portions form a single head of said side of the first and second slot portions and are of increasing length from the center of the coil to the outside of the coil.

Preferably, the heads of the two ends of the coil extend along junction planes perpendicular to the median plane of the coil.

Alternatively, on each side of the first and second slot portions, the junction portions of the coil are stacked in at least two juxtaposed heads extending according to junction planes parallel to one another, the junction portions being superposed on one another, in particular on the flat face of the conducting wire, alternatively on both of the heads. The two junction planes are preferably offset laterally by a distance substantially equal to the width of the flat face of the conducting wire so that the two adjacent heads are laterally contiguous. In particular, this makes it possible to reduce the radial size of the coil ends in order to facilitate the manufacture of the electrical machine. Preferably, the junction planes are perpendicular to the median plane of the coil.

The first slot portions can be superposed along a single column extending perpendicular to the median plane of the coil, that is to say configured to extend radially into the first slot, and the second slot portions can be superposed in a single column perpendicular to the median plane, that is to say configured to extend radially into the second slot. Preferably, the width of the wire of the first and of the second slot portion is substantially equal to the width of the first and of the second slot, respectively, wherein it is inserted.

As a variant, the first slot portions are superposed according to several, in particular two, juxtaposed columns extending perpendicular to the median plane, and the second slot portions are also superposed according to several, in particular two, juxtaposed columns extending perpendicular to the median plane. In this case, preferably, the junction portions on one side of the slot portions are stacked in as many heads as there are juxtaposed columns of the junction portions, and the junction portions on the other side of the slot portions are stacked in a number of juxtaposed heads corresponding to the number of columns of the slot portions plus one, the heads extending along junction planes parallel to one another and preferentially perpendicular to the median plane of the coil.

The first slot portions of the consecutive turns can extend over different columns and the second slot portions of the consecutive turns can extend over different columns.

The coil can be configured to be arranged in the slots of the stator in a concentrated or distributed manner.

"Concentrated" is understood to mean that the coil is wound around a single tooth and the first and second slots are adjacent.

"Distributed" means that the first and second slots are not adjacent. Preferably, the coil is configured to be arranged in the first and the second slot in a distributed manner.

The number of columns may be greater than or equal to 1, preferably between 1 and 3, for example equal to 1 or 2.

The number of columns can be greater than or equal to 2 and the first slot portions and second slot portions of the successive turns can be stacked alternately on the different corresponding columns.

The ends of the coil may extend on the same side of the first and second slot portions.

The number of heads on which the junction portions of said side of the slot portions are stacked is for example equal to the number of columns plus one.

The number of heads formed by the junction portions extending from the other of the sides of the slot portions may be greater than or equal to the number of columns minus one, for example greater than or equal to the number of columns, or even strictly greater than the number of columns, for example equal to the number of columns plus one.

In one embodiment, the number of heads on one side can be equal to the number of columns plus one and the other equal to the number of columns or to the number of columns plus one.

The heads before bending extend preferentially along junction planes parallel to one another, in particular perpendicular to the median plane of the coil.

Cluster

Another object, according to another aspect, is a coil cluster comprising a plurality of coils as described above, the coils being connected together by continuity of the conducting wire.

Stator

According to another aspect, the the machine also comprises a stator comprising:
 a ring comprising:
  teeth forming between them slots that open radially outwards, and
  material bridges each connecting two adjacent teeth at their base on the side of the air gap and defining the bottom of the slot between these teeth,
 coils each arranged in a first and a second slot of the stator,
 a yoke attached to the ring.
 each coil being wound in a plurality of successive turns, each turn comprising:
  a first half-turn comprising a first slot portion configured to be inserted in the first slot of the stator,
  a second half-turn connected to the first half-turn comprising a second slot portion configured to be inserted in the second slot of the stator, the first slot portions of the successive turns being arranged in the first slot of the stator in a radially inverse order of the second slot portions of the successive turns in the second slot.

The term "the first slot portions of the successive turns being arranged in the first slot of the stator in a radially inverse order of the second slot portions of the successive turns in the second slot", it is understood that the slot portions are arranged in the first slot according to a radial order of the particular successive turns and that the second slot portions are arranged in the second slot according to a radial order of the successive reverse turns. That is, if the first slot portion of the first turn of the coil is radially innermost in the first slot of the stator, the second portion of this same turn is radially outermost in the second slot of the stator and vice versa.

This is because the first slot portions and the second slot portions are stacked in an identical order starting from the median plane of the coil toward the external planes, that is, the first slot portions taken from the first turn to the last turn of the winding are stacked from the median plane toward one of the external planes, then the second slot portions taken from the first turn to the last turn of the winding are also stacked from the median plane toward one of the external planes, and vice versa. Thus, it is understood that if the first slot portion of the first turn of the coil is the innermost of the coil, the second slot portion of this same turn is the innermost of the coil and vice versa.

Each coil comprising several turns, a reduction in losses by induced currents, or Joule AC losses, is achieved, which is particularly advantageous when the operating speed is high. The heat transfer to the cold source is also facilitated.

The inversion of the order of the slot portions in the first and second slots, also called "transposition", in particular makes it possible to minimize the circulation currents between slot portions of the same coil in each of the first and second slots.

The term "attached yoke" should be understood as meaning that the yoke is not made from the same piece as the ring but is attached thereto during the manufacture of the stator.

The fact that the slots are open radially outwards allows the windings to be inserted into the slots by a radial movement towards the inside of the slots. The installation of the windings is facilitated, on the one hand, in that access to the inside of the slots is easier, since the slots open completely and in the outward direction rather than towards the air gap, and on the other hand, in that the space available around the ring, for the necessary tools, or even for a machine for winding, is greater than the space available in the bore of the stator.

During the insertion of the electrical conductors into the slots, which is done radially and not axially, the conductors move in contact with a length of the stator mass which at its greatest point corresponds to the depth of the slot. This results in lower mechanical stresses than for axial insertion, where the conductors are exposed to a movement in contact with the stator mass over a length equal to the axial dimension thereof. Due to the lower mechanical stresses during insertion, the insulating coating covering the electrical conductors is less stressed and the risk of deterioration is reduced, such that the presence of a sheet insulator around the coil is no longer necessary when the insulator is made of polymer.

The yoke makes it possible to close the slots of the ring and to hold the windings in the slots after their insertion.

During the manufacture of the stator, the yoke can be assembled with the ring in various ways.

Due to the fact that the slots are closed after assembly of the yoke, the risk of leakage of the impregnation varnish toward the air gap is eliminated. The stator can be used as a closed impregnation enclosure by ensuring a seal at only the ends of the stator. The tooling is thus simplified. This also reduces the amount of lost varnish and cleaning operations.

Furthermore, such a stator has many advantages from the electromagnetic point of view relative to a stator having slots open towards the air gap. It makes it possible to greatly reduce the electromagnetic disturbances related to the presence of the openings of the slots that open onto the air gap in the prior art.

The absence of slots opening onto toward the air gap makes it possible to reduce the cogging of slots. The electromagnetic performance of the machine is improved.

Slots

At least one slot, or better still all the slots, may have opposite edges parallel to each other. The width of the slots is preferably substantially constant over their entire height.

At least one tooth, or better still all the teeth, may be generally trapezoidal when viewed in section in a plane perpendicular to the axis of the stator.

Preferably, several material bridges each have a deformable area, and preferably all the material bridges, each have a deformable area. "Deformable area" means an area of the material bridge deforming preferentially during a relative movement of the teeth that it connects. The deformation of the material bridge may result in an elongation or shortening of the circumferential dimension of the material bridge, which causes an elongation or shortening of the circumferential dimension of the ring. The preferential deformation may result from a particular shape given to the bridge.

The deformable area makes it possible to adapt to the mechanical stresses experienced by the ring during the assembly of the ring with the yoke. In addition, if it is desired to have slots that are more open before mounting the yoke and therefore a greater clearance between the electrical conductors and the wall of the slots during the insertion of the electrical conductors, which facilitates that insertion and reduces the risk of damage to the insulators.

Preferably, the material bridges each have a reduced magnetic permeability zone, in particular in the form of at least one localized constriction, at least one localized crushing, at least one opening or at least one localized treatment. The reduced magnetic permeability zone of the material bridge is magnetically saturated during the operation of the machine, which limits the passage of the flow and increases the efficiency of the machine.

Preferably, the bottom of the slots each has at least one planar portion against which at least one electrical conductor, preferably of substantially rectangular section, is supported. The planar portion(s) are substantially perpendicular to the radial axis of the slot.

The bottom of the slot may be flat, except for a recess and/or a deformable area.

The deformable area or the indentation preferably forms a clearance between the material bridge and the corresponding one or more electrical conductors, which can facilitate the penetration of the varnish during the impregnation of the stator.

This allows good filling of the slots by the electrical conductors in the case of electrical conductors of rectangular cross section, allowing the electrical conductors to lie flat in the bottom of the slot.

Interface Between Yoke and Ring

Preferably, the ring has reliefs on its radially outer surface, mating with complementary reliefs, in particular nested in one another, of the yoke. Such reliefs make it possible, by mating of shapes, to hold the ring and the yoke stationary relative to one another. The mating reliefs are preferably of the dovetail and mortise type or reliefs bearing against one another.

The ring can be produced by helically winding a strip of sheet metal comprising teeth connected by the material bridges, the opposite edges of each slot preferably becoming substantially parallel to one another when the strip is wound on itself to form the ring.

As a variant, the strip may be formed of sectors each comprising several teeth, the sectors being connected by connections, these sectors being cut out from a strip of sheet metal. The connections can be flexible bridges connecting the sectors together and/or portions of complementary shapes, for example of the dovetail and mortise type or complementary reliefs bearing against one another, in particular when the ring is kept in compression by the yoke.

The complementary shapes may be on the material bridges such that the different sectors are assembled on the material bridges. Preferably, the assembly of the complementary shapes of the different sectors is done outside the deformable zones of the material bridges. This facilitates assembly, in particular in the case of large machines. For example, the sectors have hollow shapes that mate with projecting shapes that are complementary to an adjacent sector.

Alternatively, the ring comprises a stack of precut magnetic sheets.

Also alternatively, the ring is manufactured by additive manufacturing, for example by powder sintering.

The yoke can be produced by winding a sheet of metal directly in a helix if its width allows it, by forming or not forming suitable slots during its cutting, so as to facilitate this winding, by stacking pre-cut magnetic sheets, or by additive manufacturing, for example by powder sintering.

The yoke is attached to the ring after the installation of the windings in the slots.

Coil

Preferably, the coils are each as described previously. The above features in relation to the other aspects apply to the method in combination or independently of the other aspects.

Preferably, the first slot portion and the innermost second slot portion of each coil have their innermost surface that extend in the slots along the same median cylinder of the coil having the stator axis as the main axis. This makes it possible to have a coil that is compact perpendicular to the median cylindrical portion. In addition, such compactness allows better filling of the slots of the stator by allowing the first and second slot portions inserted in a slot to be in contact with one another. This improves cooling.

Alternatively, the innermost first and second slot portions of each coil have their innermost surfaces which extend in two different cylinders spaced apart radially by a non-zero distance.

The term "the innermost of each coil" means the closest to the median cylinder portion of each coil.

Preferably, each coil has a radial form factor less than or equal to the depth of the slots (dimensions of the slots in the radial directions).

Preferably, each coil is entirely comprised between two external cylinders of the same central axis as the median cylinder and defined by the surfaces furthest from the median cylinder of the first and second slot portions that are the outermost of the coil. The fact that the coils extend entirely between cylinders defined by surfaces of the outermost slot portions parallel to the median cylinder makes it possible to have compact coils in the radial direction at the coil ends, that is to say the portions that extend out of the slots after the insertion of the coils into the slots.

"The coil being entirely comprised between two external cylinders of the same central axis as the median cylinder and defined by the surfaces furthest from the median cylinder of the first and second slot portions that are the outermost of the coil" means that the coil has, at the coil ends, a radial form factor that is equal to or smaller than the sum of the radial form factor of the first and second slot portions. Consequently, the coil ends of the coils have a radial form factor that is less than or equal to the depth (dimensions of the slots in the radial direction) of the slots.

Alternatively, the coil ends have a radial form factor greater than the depth of the slots.

The coils may have an angular extent of between 20° and 180°, better still between 50° and 80°, preferably substantially equal to 65°.

Preferably, the first and second slot portions are of the same length.

Preferably, the first and second half-turns are of the same length.

Each coil is preferably of substantially hexagonal shape, in particular with two opposite sides formed by the first and second slot portions longer than the others, in particular at least twice as long as the other sides of the hexagon. Alternatively, the first and second slot portions are shorter than the other sides of the hexagon.

Each coil is preferentially formed from one or more conducting wires, preferably a single conducting wire. Preferably, the conducting wire(s) are, in cross-section, of circular shape, or of polygonal shape, in particular with rounded edges, preferentially of rectangular shape, among other possible shapes. Preferably, the conducting wire has a rectangular cross-section. Preferably, the first slot portions are stacked on one another by being in contact with one another on their widest face, otherwise called the flat face, and the second slot portions are also stacked on one another by being in contact with one another by their flat face.

Preferably, the conducting wire of the coil is electrically insulated by an insulating coating, in particular an enamel.

Preferably, the first and second slot portions are rectilinear.

Preferably, the first and second half-turns of each coil each extend along a half-turn cylinder, in particular parallel to the flat face of the conducting wire, the half-turn cylinders of the first and second half-turns being parallel to one another and parallel to the median cylinder of the coil. Preferably, the half-turn cylinders of the first half-turns all extend on the same side of the median cylinder of the corresponding coil and the half-turn cylinders of the second half-turns all extend from the other side of the median cylinder of the corresponding coil.

Preferably, the second half-turns are each connected to the first half-turn of the same turn and to the first half-turn of the next turn by junction portions.

Preferably, the first and second half-turns each comprise two coil portions extending on either side of the respective first and second slot portions. The coil end portions are connected to the junction portions between the first and second half-turns and intended to extend out of the first and second slots. The coil end portions are preferably rectilinear before insertion of the slot portions in the slots of the stator and curved after insertion to adopt the curvature of the stator. Preferably, the coil portions extend on the same cylinder as the corresponding first or second slot portion. The coil end portions can form a non-zero angle with the corresponding first or second slot portion. The angle between the first or the second slot portion and the coil end portions may be between 5° and 90°, preferably between 40 and 60°.

Preferably, the junction portions between the first and second half-turns and a portion of the first and second half-turns, in particular the coil end portions of the half-turns, form two coil ends of the coil extending on either side of the stator when the coil is inserted in the stator.

Preferably, each junction portion is a loop portion extending between the first and the second half-turn that it connects, in particular between the coil end portions of the first and the second half-turn that it connects. Preferably, the innermost junction portion of each coil forms a substantially complete loop, the other junction portions preferentially forming loop portions with an angular extent substantially equal to 180°.

Alternatively, all the junction portions form loop portions with an angular extent substantially equal to 180°.

For each coil, from the two sides of the first and second slot portions, the junction portions of the corresponding coil can all be stacked along the same junction plane by each being superposed on one another, in particular on the flat face of the conducting wire. Thus, the junction portions form a single head at each end of the corresponding coil and are of increasing length from the center of the corresponding coil to the outside of the corresponding coil. Preferably, the heads of the two ends of the coil extend along the same junction plane, in particular a radial plane of the stator.

Alternatively, for each coil, on each side of the first and second slot portions, the junction portions of the coil are stacked in at least two juxtaposed heads extending according to junction planes parallel to one another, the junction portions being superposed on one another, in particular on the flat face of the conducting wire, alternatively on both of the heads. The two junction planes are preferably offset laterally by a distance substantially equal to the width of the flat face of the conducting wire so that the two adjacent heads are laterally contiguous. In particular, this makes it possible to reduce the radial size of the coil ends in order to facilitate the manufacture of the electrical machine. Preferably, the junction planes are radial planes of the stator.

For each coil, the first slot portions can be superposed along a single column extending in a radial plane of the stator, that is to say configured to extend radially in the first slot, and the second slot portions can be superposed in a single column extending in a radial plane of the stator, that is to say configured to extend radially in the second slot. Preferably, the width of the wire of the first and of the second slot portion is substantially equal to the width of the first and of the second slot, respectively, wherein it is inserted.

As a variant, for each coil, the first slot portions are superposed according to several, in particular two, juxtaposed columns extending in a radial plane of the stator, and the second slot portions also are superposed according to several, in particular two, juxtaposed columns extending in a radial plane of the stator. In this case, preferably, the junction portions on one side of the slot portions are stacked in as many heads as there are juxtaposed columns of the junction portions, and the junction portions on the other side of the slot portions are stacked in a number of juxtaposed heads corresponding to the number of columns of the slot portions plus one, the heads extending along junction planes corresponding to radial planes of the stator.

The coil can be configured to be arranged in the slots of the stator in a concentrated or distributed manner, wherein,
"Concentrated" is understood to mean that the coil is wound around a single tooth and the first and second slots are adjacent.
"Distributed" means that the first and second slots are not adjacent.

Preferably, the coil is configured to be arranged in the first and the second slot in a distributed manner.

The slot portions can be separated from the inner surface of the slots by a sheet insulator. The coil may comprise at least one sheet insulator attached to a portion of the coil, in particular surrounded around a portion of the coil. The portion of the coil covered with the sheet insulator preferably corresponds to the first or to the second slot portions. Preferably, the coil comprises at least two sheet insulators attached to two portions of the coil corresponding respectively to the at least first and second slot portions, in particular surrounded around two portions of the coil.

Preferably, the portions of the coil received in the slots are covered with a sheet insulator over their entire surface inserted in the slots.

The coils can be grouped into coil clusters comprising a plurality of coils as described previously, the coils of a cluster being connected together by continuity of the conducting wire, in particular at the coil ends.

Electrical Machine

The object, according to another aspect, is also a rotating electrical machine comprising a stator as described above or comprising a stator having slots and coils or coil clusters defined above, the first slot portions of which are inserted into one of the slots and the second slot portions are inserted into another of the slots, the set of slots receiving first slot portions of a coil and second slot portions of another coil.

The features mentioned above, in relation to the preceding aspects, can also be applied to this aspect in combination with or independently of the other aspects.

Manufacturing Methods

According to another aspect, to a method for manufacturing an electric coil for a rotating electrical machine is disclosed, comprising the steps of:
(a) shaping at least one conducting wire using a forming system to form an alternation, along the conducting wire, of at least one first half-turn and at least one second half-turn,
(b) folding the first and second half-turns on one another starting from a first end of the conducting wire to a second end of the conducting wire, to form a winding forming at least one turn.

Such a manufacturing method makes it possible to manufacture compact coils, the coil ends of which, that is to say the portions of the coil that extend out of the slots after the insertion of the coils into the slots, are reduced in form factor.

It also allows better filling of the slots, which improves cooling and reduces the amount of electrical conductor used.

It also makes it possible to have an inversion of the order of the slot portions of the turns of the coil in the slots wherein the coil extends, also called "transposition", in order to minimize the circulation currents between slot portions of the same coil in each of the first and second slots.

Preferably, the method is a method for manufacturing the coil according to one of the preceding aspects or a cluster as described above. The method may also be a method for manufacturing the coil received in a stator as described above.

The manufactured coil may be one of the coils as described above. The above features in relation to the other aspects apply to the method in combination or independently of the other aspects.

Preferably, the folding(s) of step (b) are each carried out by rotating about an axis transverse to an axis of extension of the conducting wire before it is shaped.

Preferably, step (a) comprises the shaping of at least one conducting wire using the forming system so as to form an alternation, along the conducting wire, of first half-turns and second half-turns.

Preferably, the adjacent first and second half-turns are each connected to one another by a junction portion of the straight conducting wire before the folding step (b). Preferably, the or each junction portion forms a loop portion during the folding of the corresponding first and second turns on one another. In the case of a plurality of first and second half-turns, the junction portions preferentially fold back on one another in step (b) from the first end to the second end of the conducting wire. The junction portions may be of increasing length from the first end of the conducting wire to the second end of the conductive wire.

Step (a) can be carried out in one or more successive shaping operations by the forming system, the or each shaping operation by the forming system comprising the following succession of steps:
positioning a portion of conducting wire in the forming system,
shaping the portion of the conducting wire by the forming system, and
extracting, from the forming system, the shaped portion of the conducting wire.

Step (a) may comprise a plurality of successive operations for shaping, by the forming system, successive parts of the conducting wire to shape at least one first or second half-turn in each part.

Steps (a) and (b) may not be distinct. Step (a) can comprise a plurality of successive shaping operations by the system for forming successive parts of the conducting wire and step (b) can be carried out in different folding sub-steps as the first and second half-turns are shaped by the forming system. Preferably, the folding of the first and second half-turns on one another is done in the order of shaping the first and second half-turns by folding the shaped first half-turn in the vicinity of the first end of the conducting wire on the adjacent second half-turn to form a winding of a coil, then by repeatedly folding the winding over the adjacent half-turn from the first end to the second end of the conducting wire.

Alternatively, the steps (a) and (b) are distinct, step (b) being carried out entirely after step (a).

Preferably, the folding of the first and second half-turns in step (b) always takes place by rotating in the same direction of the first end of the conducting wire toward the second end of the conducting wire.

Preferably, the forming system comprises a plurality of rollers comprising:
rollers with fixed axes during the shaping steps, and
rollers with movable axes during the shaping steps between a rest position wherein the conducting wire is not deformed and a deformation position of the conducting wire.

The presence of the rollers with fixed and movable axes makes it possible to have a versatility of the dimensions of the coil that can be formed. The dimension of the coil is in particular dependent on the chosen positioning of the rollers.

The rollers with movable axes preferably have an axis movable transversely to an axis of extension of the conducting wire in the absence of shaping.

The fixed and/or movable axis rollers can be retractable. "Retractable" is understood to mean that the rollers can be removed from their location or pressed into a housing provided for this purpose to release the shaped conducting wire and facilitate its extraction. This makes it possible to facilitate the extraction of each of the portions of conducting wire of the forming system and optionally to change the position of the rollers with fixed and/or mobile axes between two shaping operations by the forming system.

At least two rollers with successive fixed axes can extend from the same side of the conducting wire.

Preferably, at least two rollers with movable axes extend between two rollers with fixed axes on one opposite side of the conducting wire by means of the two rollers with fixed axes.

Preferably, each wheel with movable axes is adjacent to two rollers with fixed axes extending from the opposite side of the conducting wire and the shaping of the conducting wire is done in step (a) by moving the movable axis rollers in translation toward the conducting wire.

Each shaping operation may comprise the steps of:
(i) extending a portion of conducting wire in the forming system configured so that the rollers with movable axes extend on the side of the conducting wire opposite to that in which the two adjacent rollers with fixed axes extend, the rollers with movable axes being in the rest position,
(ii) moving the rollers with movable axes to the deformation position to shape the portion of conducting wire, and
(iii) retracting the rollers with fixed and/or movable axes once the corresponding half-turn is formed to extract the shaped conducting wire portion from the forming system.

Step (a) may comprise the steps of:
(a1) shaping a first portion of the conducting wire using the forming system in a first configuration by a first shaping operation,
(a2) shaping a second portion of the conducting wire adjacent to the first portion of the conducting wire using the forming system in a second configuration by a second shaping operation.

The first and second portions of the conducting wire are preferably of the same length.

The first and second configurations of the forming system may be identical or, preferably, different. In the case where the first and second configuration of the forming system are identical, the first and second portions are of the same shapes after shaping and in the case where the first and second configuration of the forming system are different, the first and second portions are of different shapes after shaping.

In the case where the first and second configuration are different, the fixed and movable rollers can each be arranged, in the second configuration of the forming system, on the opposite side of the conducting wire relative to their position in the first configuration of the forming system. This makes it possible in particular to shape the first and second parts respectively symmetrically relative to the axis of extension of the wire before deformation and avoids having to bend back the wire during the folding of the half-turns on one another. The folding is then done by tilting the first half-turn on the second half-turn about an axis transverse to the axis of the conducting wire before deformation, without any other deformation of the conducting wire.

In step (a1), the shaping of the first part of the conducting wire can form a first half-turn and in step (a2) the shaping of the second part of the conducting wire can form a second half-turn, the first and the second half-turn being configured to form a complete coil in step (b).

The conducting wire before forming can extend along a longitudinal axis extending between the first and second half-turns after forming, in particular along the longitudinal axis of the coil formed.

In the case where the first and second configurations are different, the forming system can comprise two rollers with fixed axes when shaping and two rollers with movable axes during shaping, arranged between the rollers with fixed axes.

The segment of the conducting wire between the two moving axis rollers in steps (a1) and (a2) can be substantially rectilinear and can be configured to fit into the slots of the electrical machine, in particular the slots of the stator.

The method may comprise the additional steps of:
(a3) shaping a third portion of the conducting wire adjacent to the second portion of the conducting wire using the forming system in the first configuration to form an additional first half-turn,
(a4) repeating steps (a2) and (a3) to form a plurality of first and second additional half-turns.

The method may comprise steps of folding the first and second half-turns as they are formed. Preferably, the method comprises the steps of:
(b1) folding, after step (a2) and before step (a3), the first half-turn shaped in step (a1) and the second half-turn shaped in step (a2) to form a winding forming a coil,
(b2) folding, after step (a3) and before step (a4), the winding obtained in step (b1) and the additional half-turn shaped in the previous shaping step to form a new winding, and
(b3) repeating step (b2) after each shaping step.

The folding step (b1) can be done by rotating the first half-turn about an axis transverse to the longitudinal axis of the conducting wire before shaping. The folding step (b2) can be done by rotating the winding about an axis transverse to the longitudinal axis of the conducting wire before shaping.

Alternatively, the first and the second configuration of the forming system are identical.

The steps (a1) and (a2) can be identical and each make it possible to shape in a single operation of the forming system at least one first half-turn and at least one part of a second half-turn adjacent to the first half-turn.

The method may comprise a step (a3) of repeating step (a2).

The steps (a1) and (a2) can be identical and can each make it possible to shape in a single operation of the forming system a first half-turn and at least one second half-turn adjacent to the first half-turn.

The conducting wire can extend along an axis extending between the first and second half-turns.

In this case, the forming system can comprise two successive windings of two rollers with fixed axes when shaping and two rollers with movable axes during the shaping extending between the rollers with fixed axes, the rollers with fixed axes of one of the two windings being arranged on the side of the conducting wire opposite the one on which the rollers with fixed axes of the other winding are arranged. In this way, one of the windings allows the formation of one of the first and second half-turns and the other of the windings allows the formation of the other of the first and second half-turns.

The method may comprise the steps of:
- (b1) folding, between steps (a1) and (a2), the first half-turn shaped in step (a1) and the second half-turn shaped in step (a1) to form a winding forming a turn,
- (b2) folding, after step (a2), the winding on the first half-turn adjacent to the winding to form a new winding, then the new winding on the second shaping half-turn in the previous step and adjacent to the winding to form a new winding, and
- (b3) repeating step (b2) between each of the various shaping steps.

Alternatively, the steps (a1) and (a2) are identical and each make it possible to shape in a single operation of the forming system a first part of a second half-turn, a first half-turn adjacent to the previous second half-turn part and a second part of a second half-turn adjacent to the first half-turn, the conducting wire before forming extending along a longitudinal axis extending laterally to the second half-turns, the first and the second half-turn part being two parts that are joined together form a second complete half-turn.

The method may comprise a step (a3) of repeating step (a2).

In this case, the forming system can comprise two first rollers with movable axes nested between two first rollers with fixed axes, themselves nested between two second rollers with movable axes, which are themselves nested between two second rollers with fixed axes along the longitudinal axis of the conducting wire. Preferably, the second rollers with fixed axes are in the vicinity of the conducting wire in order to hold it along the longitudinal axis, the first rollers with fixed axes are spaced apart from the longitudinal axis thereto by the width of the second half-turn(s); the second rollers with mobile axes move transversely to the longitudinal axis by the width of the second half-turn(s) and the first rollers with mobile axes move transversely to the longitudinal axis by the width of a coil.

The method may comprise the steps of:
- (b1) folding, after step (a2), the first half-turn shaped in the previous shaping step on the adjacent second half-turn to form a winding forming a coil then folding the winding onto the first half-turn adjacent to the winding to form a new winding, and
- (b2) repeating step (b1) between each of the various shaping steps.

The formed winding preferably comprises a plurality of turns of conducting wire.

The winding is preferably of substantially hexagonal shape, in particular with two opposite sides longer than the others, in particular at least twice as long as the other sides, the latter being able to have substantially the same length. The first and second half-turns can each have a straight slot portion intended to be inserted in the slots of the rotating electrical machine and two coil end portions forming a non-zero angle with the slot portion and intended to form the coil ends of the coil.

Preferably, the junction portions between the first and second half-turns each form, after folding the first and second half-turns one onto one another, a loop portion.

In the case of a winding having a plurality of turns, during the folding of the first and second half-turns one on top of one another, the conducting wire, in particular each junction portion, can be wound around at least one loop portion formed previously by the folding(s) of the first and second half-turns folded previously. The conducting wire, in particular each junction portion, can be wound into a single head at each end during the folding of the first and second half-turns between one another, the junction portions being superposed on one another at each end. As a variant, the junction portions are wound into at least two heads at each end during the folding of the first and second half-turns between them so that the junction portions are wound alternately on either of the heads.

The winding can constitute a coil as described above.

The method may comprise a step of assembling at least two superposed windings to constitute a coil of the rotating electrical machine. The junction portions of the coil ends of the different windings can be offset relative to one another perpendicularly to the longitudinal axis of the conducting wire before shaping.

The method may comprise an additional step of separating the first and second half-turns relative to one another after folding. Such separation makes it possible to angularly open the junction portion(s) at the coil ends. This makes it possible to reduce the size of the coil, in particular coil ends, to facilitate its cooling.

The method may comprise a step of bending the coil, in particular when it is inserted in the slots of the rotating electrical machine, so that it extends into the slots based on the shape of the stator of the rotating electrical machine, in particular by following a cylindrical surface.

The method can comprise the fixing of a sheet insulator at least on the portions of the coil intended to be received in the slots of the stator.

BRIEF DESCRIPTION OF THE DRAWINGS

The disclosed machines and methods can be better understood on reading the following detailed description of non-limiting embodiments thereof, and on examining the appended drawings, in which.

DETAILED DESCRIPTION

Figure 1A:
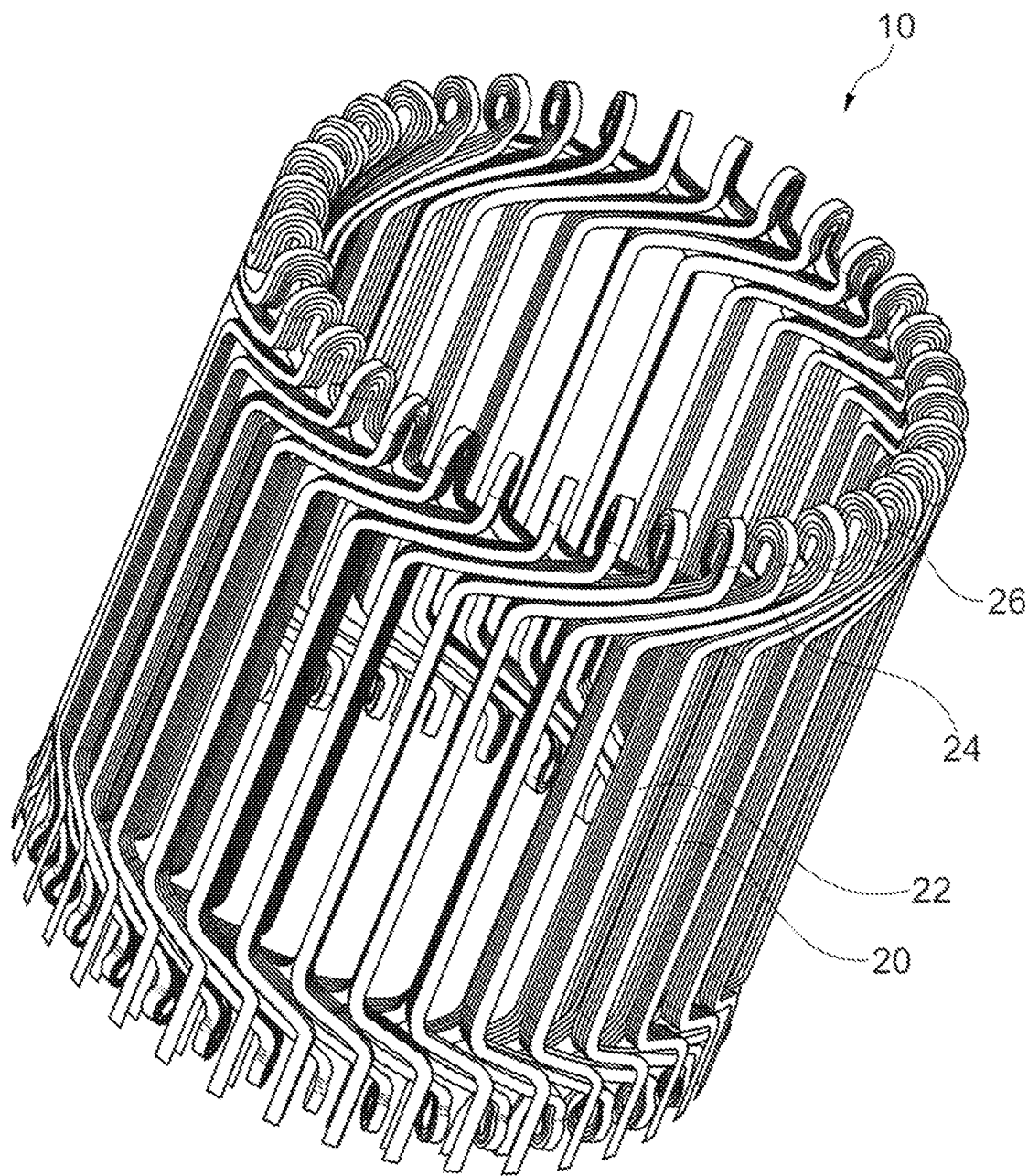
FIG. 1A schematically shows an example of a winding in perspective.

FIG. 1A shows a winding 10 arranged according to the arrangement that it would have in the stator (not shown) of the machine.

Figure 1B:
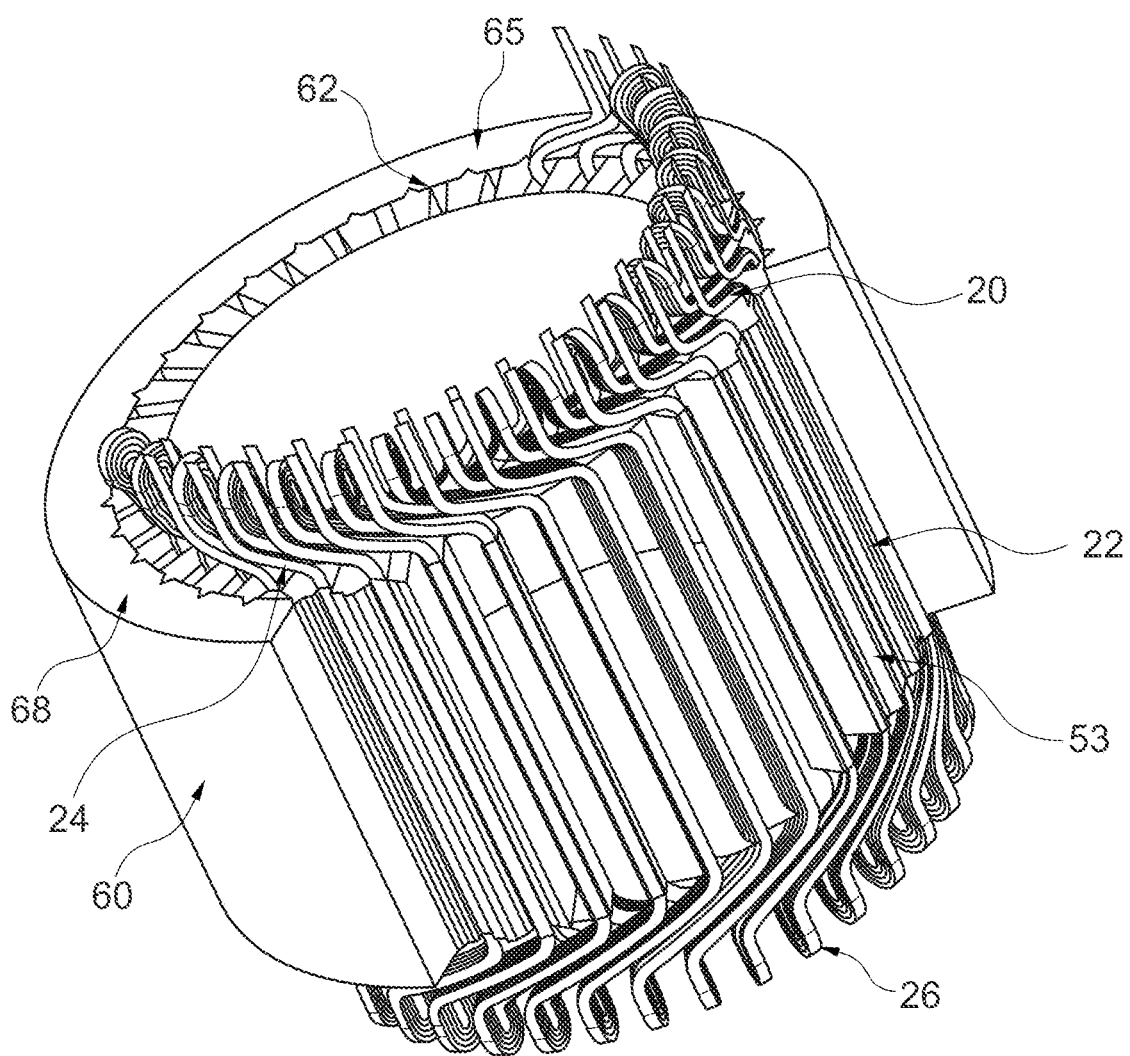
FIG. 1B shows an example of a stator with a portion of the coils.

FIG. 1B shows coils 20 inserted in the slots 62 of the stator 60.

Figure 2:
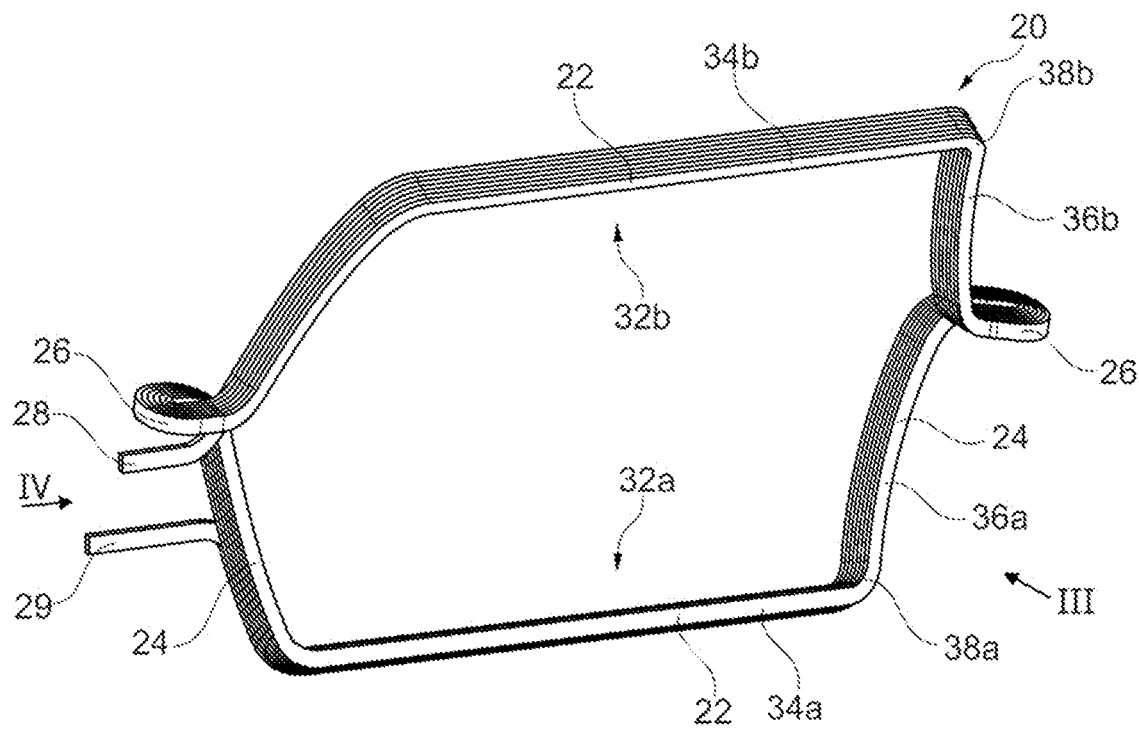
FIG. 2 schematically and separately shows, in perspective, an example of a coil.
Figure 3:
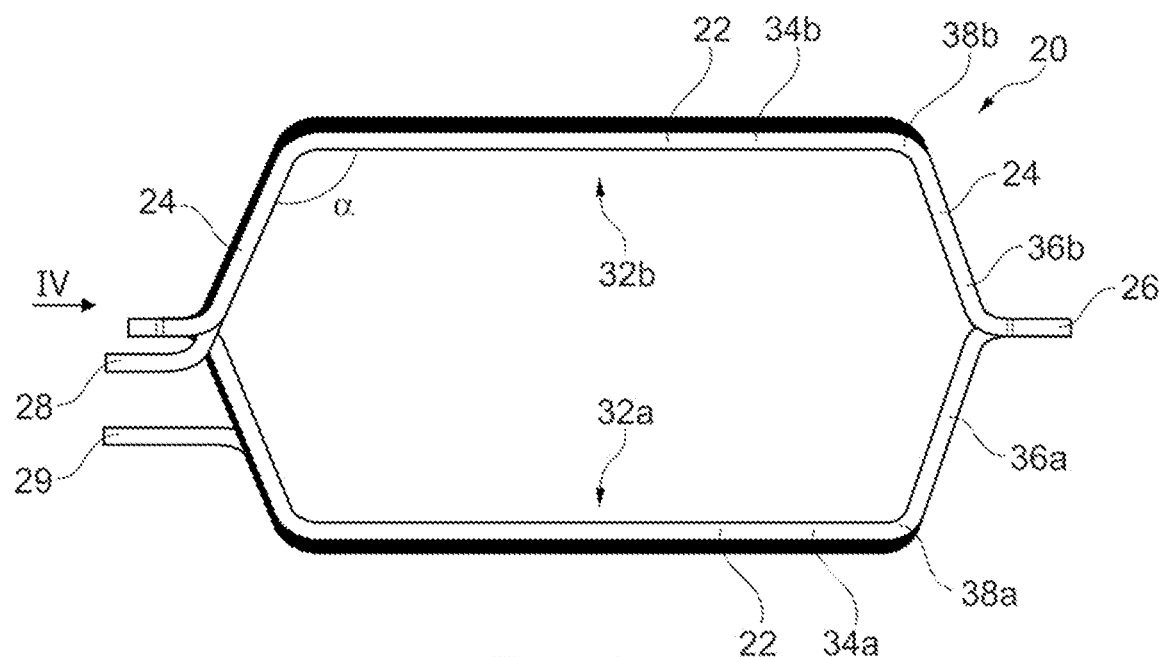
FIG. 3 is a view along III of the coil of FIG. 2.

FIGS. 2 and 3 show a coil 20 in isolation.

Each coil 20 has two straight portions 22 intended to be inserted in the slots 62 of the stator 60, as is shown in FIG. 1B, and connected to one another at each of their ends by the coil ends 24 intended to extend out of the slots, on either side thereof.

Figure 4:
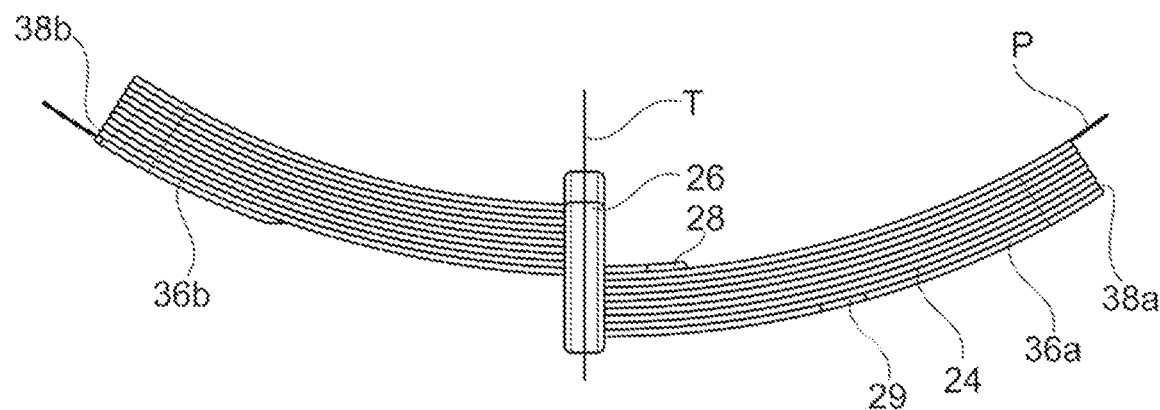
FIG. 4 shows the coil of FIGS. 2 and 3 along IV.
Figure 5:
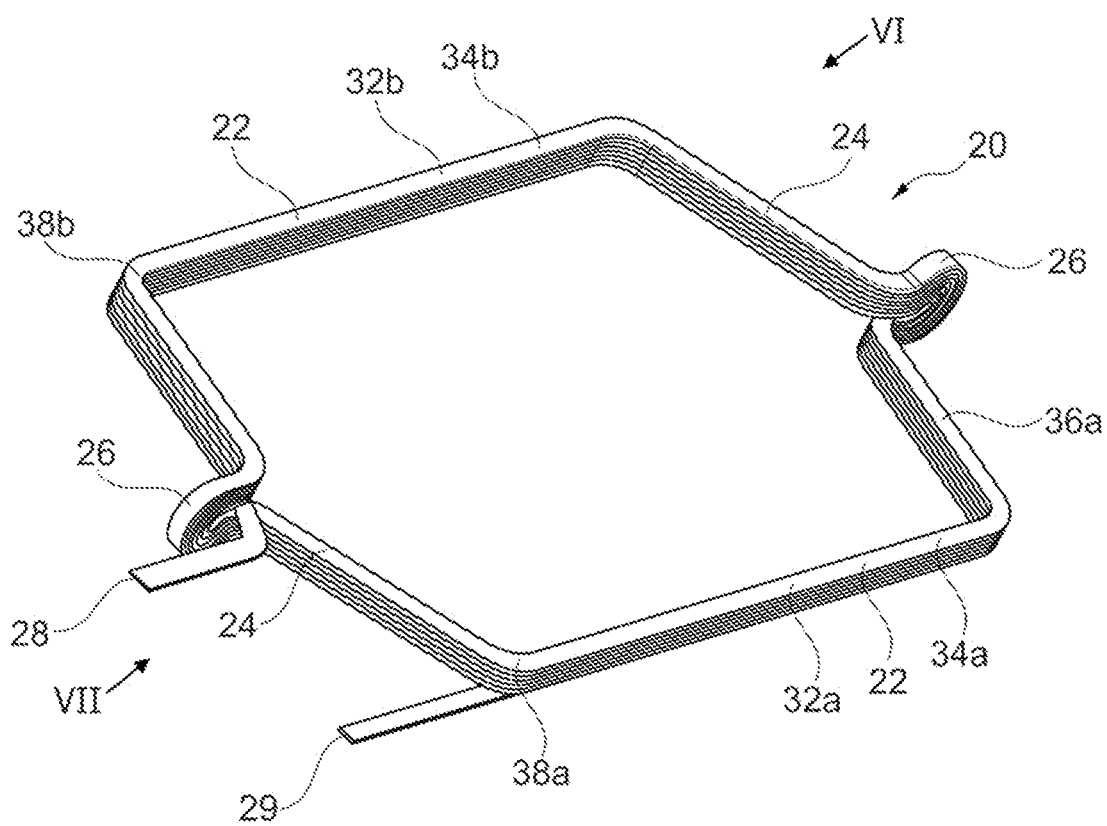
FIG. 5 schematically and in perspective shows the coil of FIGS. 2 and 3 before bending.
Figure 6:
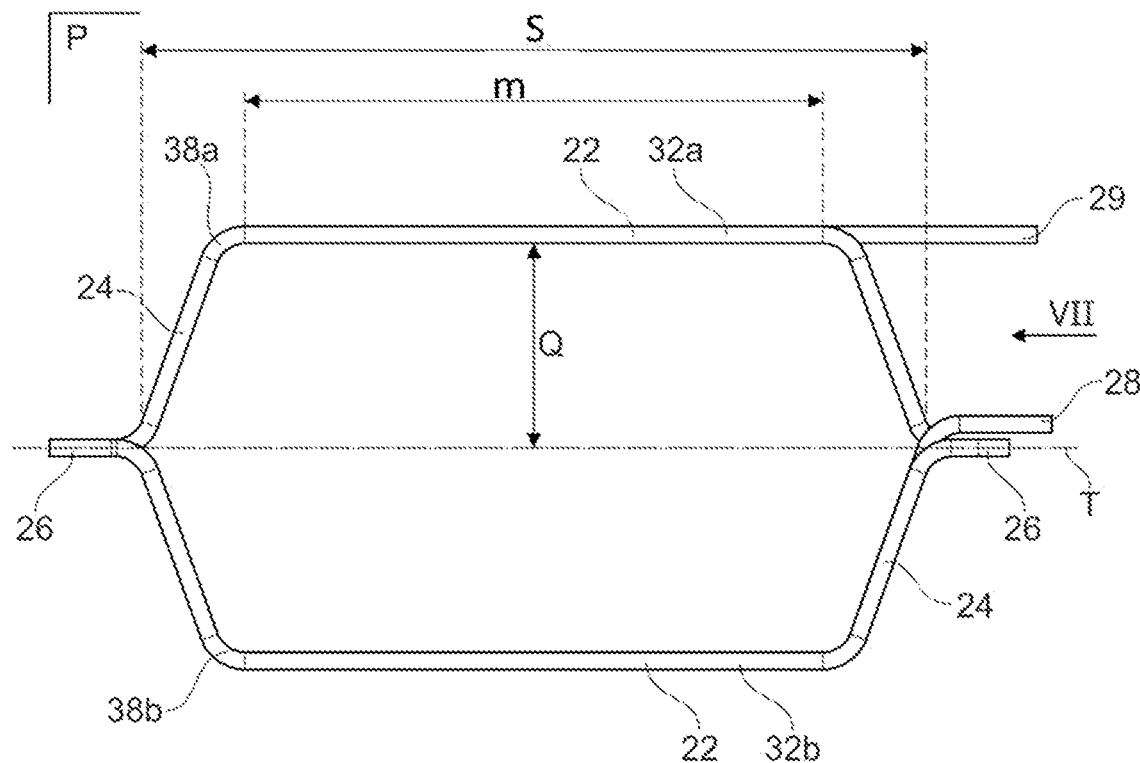
FIG. 6 is a view along VI of the coil of FIG. 5.
Figure 7:
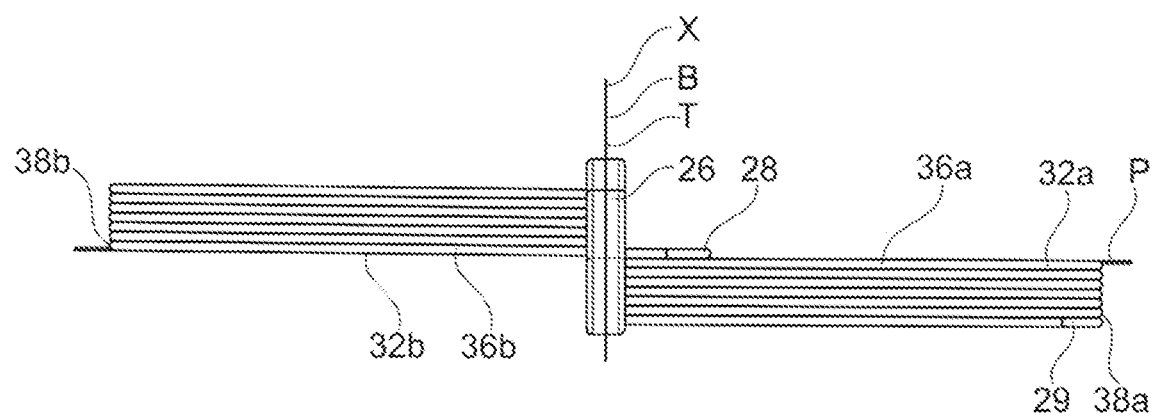
FIG. 7 shows the coil of FIGS. 5 and 6 along VII.

The coils 20 are bent prior to their insertion into the slots 62 of the stator 60 to allow their insertion therein. As shown in FIG. 4, the coils 20 extend along a median cylinder P of the same curvature as that of the outer surface of the stator on which they are intended to be mounted, the straight portions 22 being rectilinear and the coil ends 24 extending in top view along an arc of a circle. The coils may have an angular extent of between 20° and 180°, better still between 50° and 80°, preferably substantially equal to 65°. Before bending the coil 20, as shown in FIGS. 6 and 7, the cylinder P has the shape of a median plane P.

In the rest of the description, we will refer to the median plane P to designate the median plane or cylinder of the coil regardless of its configuration.

In the example shown, the coils 20 are of substantially hexagonal shape in front view and are formed by winding a conducting wire 30 into a plurality of turns each formed of a first half-turn 32a and a second half-turn 32b connected to one another by a junction portion 40, the turns also being connected together by junction portions 40. The first half-turns 32a extend mainly on one side of a transverse plane T perpendicular to the median plane P and the second half-turns 32b extend mostly from the opposite side of this transverse plane T relative to the first half-turns 32a. The conducting wire 30 has a rectangular section, its smallest side forming the edge face and its long side forming the flat face.

The first half-turns 32a are all of identical shape and are superposed while being in contact in pairs, preferably over their entire length. The conducting wires 30 of the first half-turns 32a are superposed on one another on their flat face. The same is true of the second half-turns.

Figure 8:
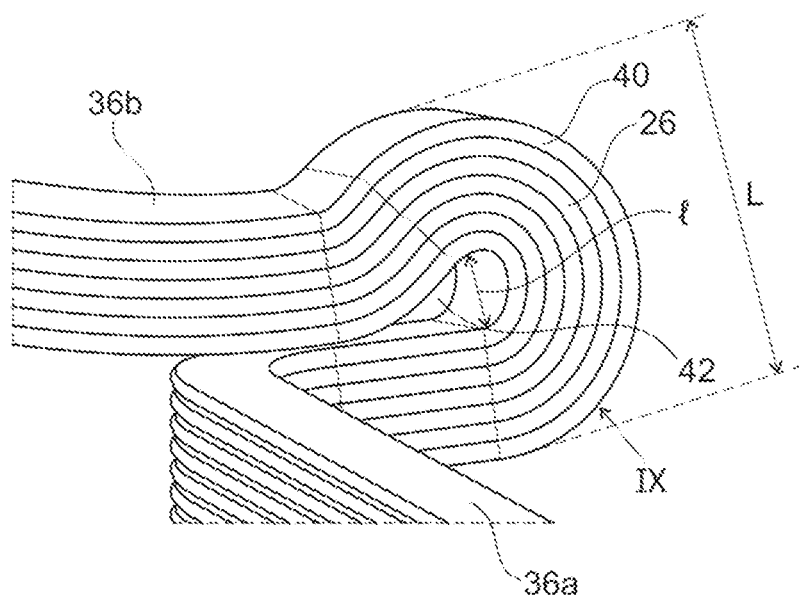
FIG. 8 shows a detail of the end of the coil of FIGS. 1 to 7.

The first half-turn closest to the median plane P and the second half-turn closest to the median plane P can be superposed while being at least partially contiguous, in particular at their ends, as is notably visible in FIGS. 7 and 8.

The first half-turns 32a all extend from a first side of the median plane P and mostly from a first side of the transverse plane T while being superposed with one another in a direction X perpendicular to the median plane P and the second half-turns 32b all extend from a second side of the median plane P opposite the first and predominantly from a second side of the transverse plane T opposite the first.

The coils 20 can comprise between 1 and 20, in particular between 5 and 15, first half-turns 32a, for example 7 first half-turns 32a as shown, and as many second half-turns 32b.

The first and second half-turns 32a and 32b comprise respective rectilinear slot portions 34a and 34b. These slot portions are connected by respective elbows 38a and 38b to respective straight coil portions 36a and 36b, which are also rectilinear. The coil end portions 36a of the first half-turns are connected to the coil end portions 36b of the adjacent second half-turns by the loop-shaped junction portions 40.

The coil portions 36a and 36b each form an angle a, visible in particular in FIG. 3, with the corresponding slot portion 34a or 34b. The angle a is for example between 90° and 150°, preferably being on the order of 120°.

The straight portions 22 of the coils 20 are formed respectively by the superposition of the slot portions 34a of the first half-turns 32a and the superposition of the second first slot portions 34b of the second half-turns 32b. The coil ends 24 of the coils 20 on either side of the straight portions 22 of the coils 20 are formed by the superposition of the coil portions 36a and 36b and of the junction portions 40 extending from the side corresponding to said coil end 24.

The order of the superposition of the first slot portions 34a in the straight portion 22 and opposite to the order of the superposition of the second slot portions 34b in the straight portion 22 so that if the first slot portion 32a of one turn is the radially innermost in the corresponding slot, the second slot portion 34b of the same turn will be the radially outermost in the slot and vice versa.

The first and second half-turns 32a and 32b are of the same length S, measured between the ends of the coil portions 36a or 36b and the slot portions 34a and 34b are of the same length m substantially equal to the height of the slots of the stator.

The first and second half-turns can be of the same width Q, shown in particular in FIG. 6, measured between the transverse plane T and the center of gravity of the intermediate portion 32a or 32b. Alternatively, the first half-turns 32a can be of a width Q different from the second half-turns 32b.

The junction portions 40 form superposed loops in the coil ends having at their center an opening 42 of width 1, in particular visible in FIGS. 7 and 8. The loops have an angular opening greater than or equal to 180°. Preferably, the loop of the innermost junction portion 40 is almost a closed ball, this resulting from the fact that the innermost slot portions 34a and 34b have surfaces extending along the median plane P.

Figure 9:
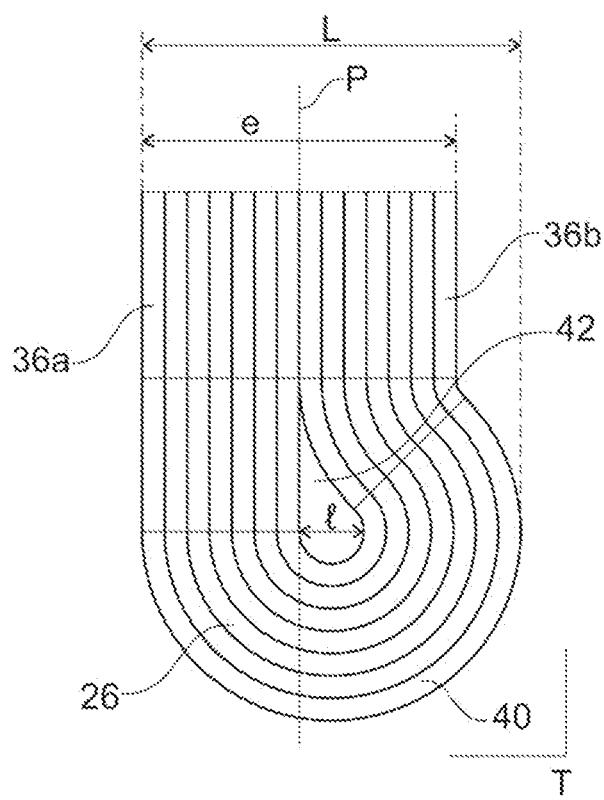
FIG. 9 shows the detail of FIG. 8, seen along IX.

The coil ends have a greater width L, taken perpendicular to the median plane P, greater than the thickness e of the excluded loop 40 coils 20, as is shown in FIG. 9.

Each coil 20 has two connection ends 28 and 29, each extending in a coil end 24, preferably in the same coil 24. A first free end 28 of the conducting wire extends from the first or second half-turn 32a or 32b closest to the median plane P and the second free end 29 of the conducting wire extends from the first or the second half-turn 32a or 32b furthest from the median plane P. In this way, the coil 20 is obtained by winding the conducting wire 30 still in the same direction as will be explained later.

In the winding 10, the adjacent coils 20 are partially superposed at their coil ends 24 by nesting in one another, the coil ends 24 being offset circumferentially from one another. The coils 20 are configured so that the straight portion 22 formed by the slot portions 34a of the first half-turns 32a of a coil 20 is superposed in the slots of the stator with the straight portion 22 formed by the slot portions 34b of the second half-turns 32b of another coil 20.

In the example shown, the free ends 28 and 29 of the conducting wire all extend on the same side of the stator.

A method for producing the coils 20 by a forming system 50 will now be described with reference to FIGS. 10 to 15.

Figure 10:
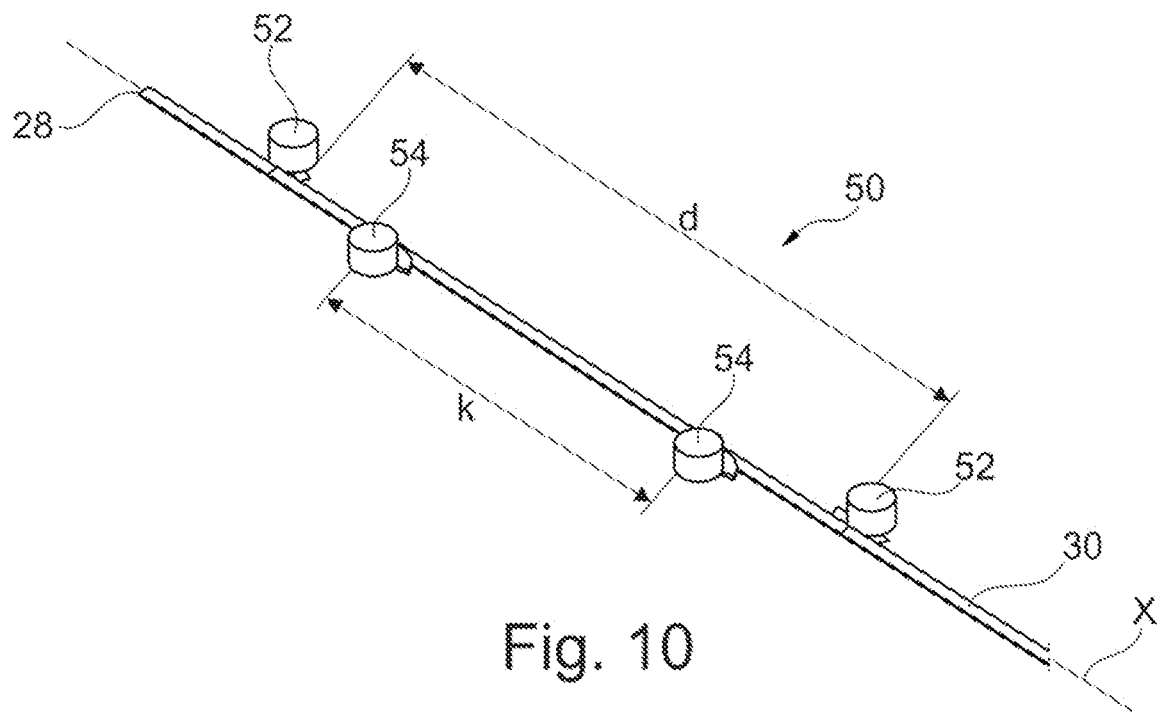
FIG. 10 schematically and in perspective shows a forming system and a portion of a conducting wire inserted in the forming system before a step of shaping that portion.
Figure 11:
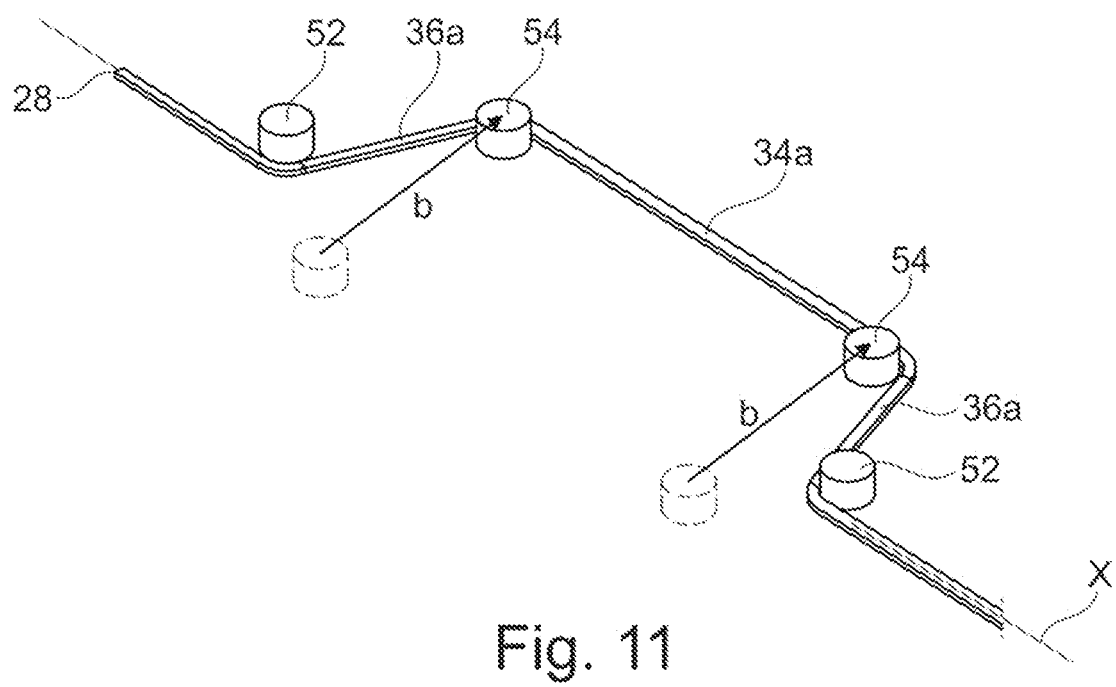
FIG. 11 shows the shaping of the portion of the conducting wire of FIG. 10 in the forming system of FIG. 10.

In the example shown in FIGS. 10 and 11, the forming system 50 comprises two rollers with fixed axes 52 on a first side of a longitudinal axis X and two rollers with movable axes 54 arranged between the rollers with fixed axes 52 on the other side of the axis X. The rollers 54 are movable in the direction of the rollers 52 perpendicular to the axis X, as is shown in FIG. 11. The rollers 52 are spaced apart by a distance d substantially equal to the length S of the first half-turns 32a. The axes of the rollers 54 are spaced apart by a distance k substantially equal to the length m of the main portion of the first half-turns 32a.

According to a first shaping operation, shown in FIG. 10, a first rectilinear part of the conducting wire 30 is positioned along the axis X between the rollers 52 and the rollers 54. Then, the rollers 54 are moved from a first position, in the direction of the rollers 52 perpendicular to the axis X by a same distance b substantially equal to the width Q of the first half-turns 32a, to a second position. The rollers 54 deform the conducting wire 30 during their movement, giving it the shape of the first half-turn 32a. The latter is then removed from the forming system. To facilitate the removal, the rollers 54 are retractable.

Figure 12:
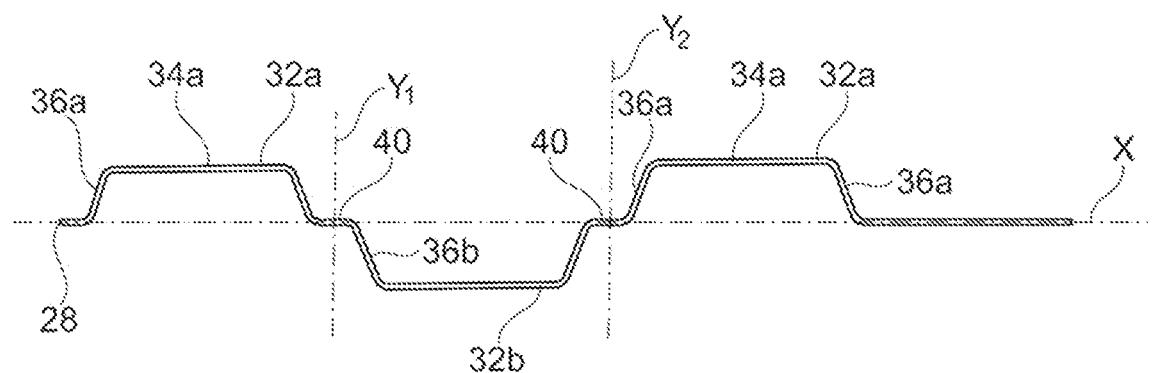
FIG. 12 schematically shows the conducting wire after three shaping steps by the forming system of FIGS. 10 and 11.

According to a second shaping operation, the rollers 52 and the rollers 54 are moved in such a way that they are positioned on the opposite side of the axis X relative to the position occupied during the previous operation. A second rectilinear part of the conducting wire 30, adjacent to the first shaping part in the previous operation, is positioned along the axis X between the rollers 52 and the rollers 54. Then, the rollers 34 are moved from their first position, in the direction of the rollers 52 perpendicular to the axis X by a same distance b substantially equal to the width Q of the second half-turns 32a, to a second position. The rollers 54 deform the conducting wire 30 during their movement, giving them the shape of a second half-turn 32b. As can be seen in FIG. 12, the first half-turn 32a previously shaped and the second half-turn 32b shaped here are connected together by a rectilinear portion. The shaped second half-turn is then removed from the forming system.

In a third shaping operation, the rollers 52 and 54 are repositioned as in the first operation and a new first half-turn 32a is shaped on a portion of the conducting wire 30 adjacent to the preceding part.

In a fourth shaping operation, the second operation is reproduced on a portion of the thread 30 adjacent to the preceding portion.

It is thus possible to successively shape the first and second half-turns 32a and 32b. The conducting wire 30 then has a succession of first and second half-turns 32a and 32b along the axis X, connected to one another by rectilinear portions, as is shown in FIG. 12.

Preferably, the rectilinear portions are increasingly long along the conducting wire, in order to allow their superposition in loops 40 without shifting the successive first and second half-turns. Indeed, the innermost junction portion 40 of the coil ends is necessarily shorter than the outermost junction portion 40 of the coil ends.

Figure 13:
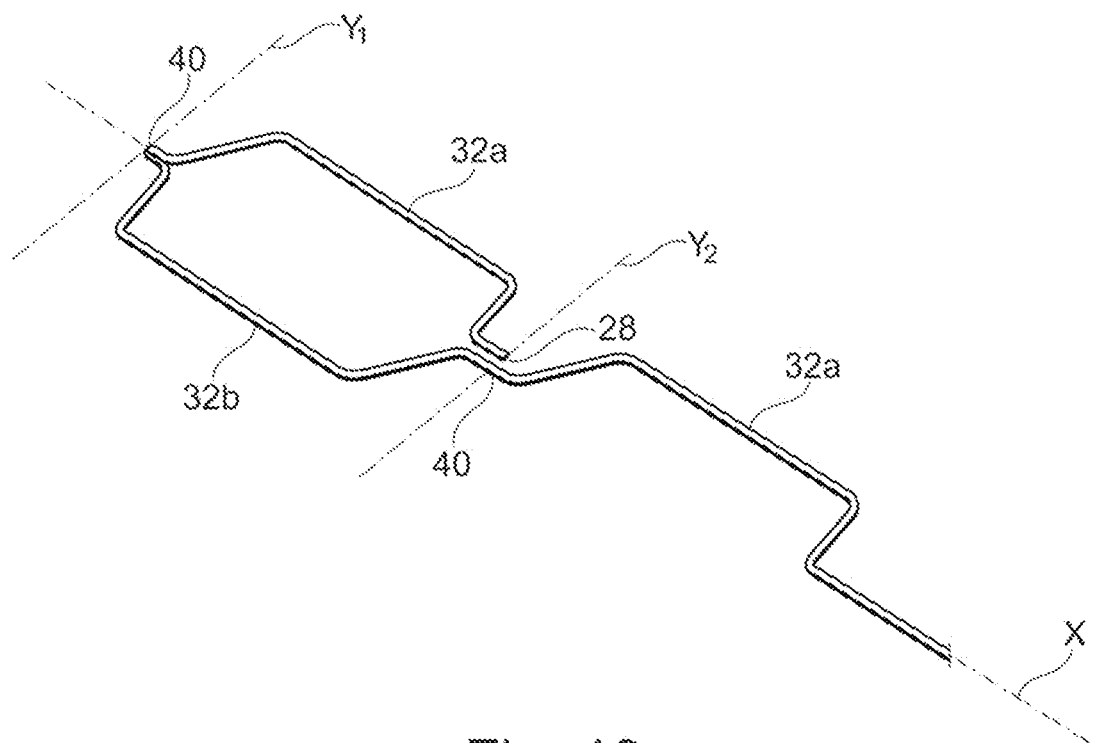
FIG. 13 schematically and in perspective shows the conducting wire of FIG. 12, after folding the first end half-turn on the adjacent second half-turn to form a coil.
Figure 14:
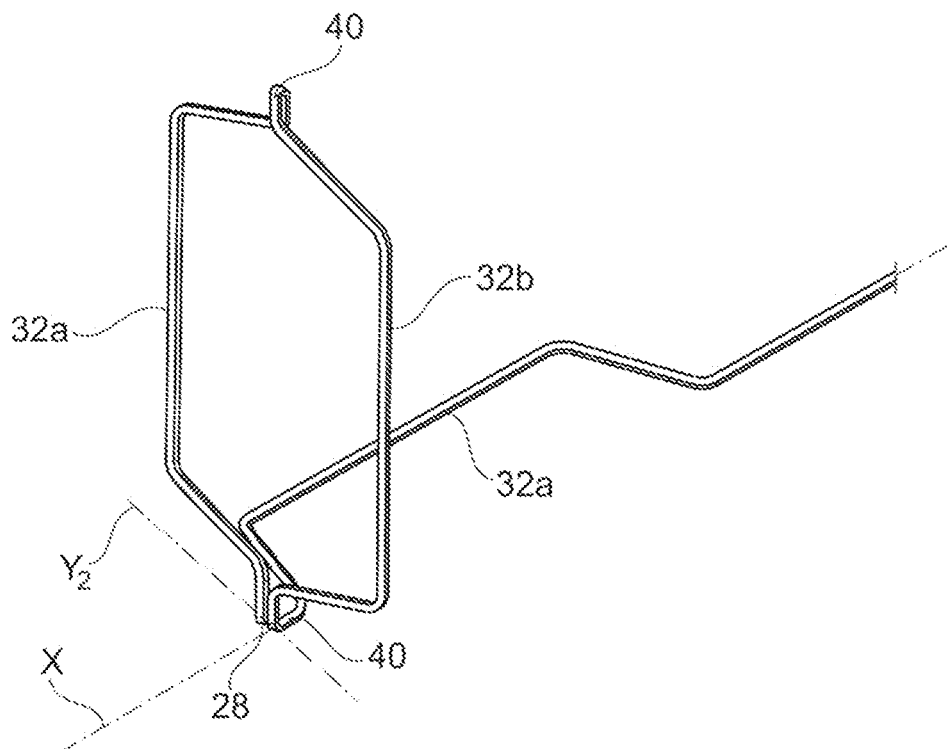
FIG. 14 schematically and in perspective shows the step of folding the coil of FIG. 13 on the adjacent first half-turn.
Figure 15:
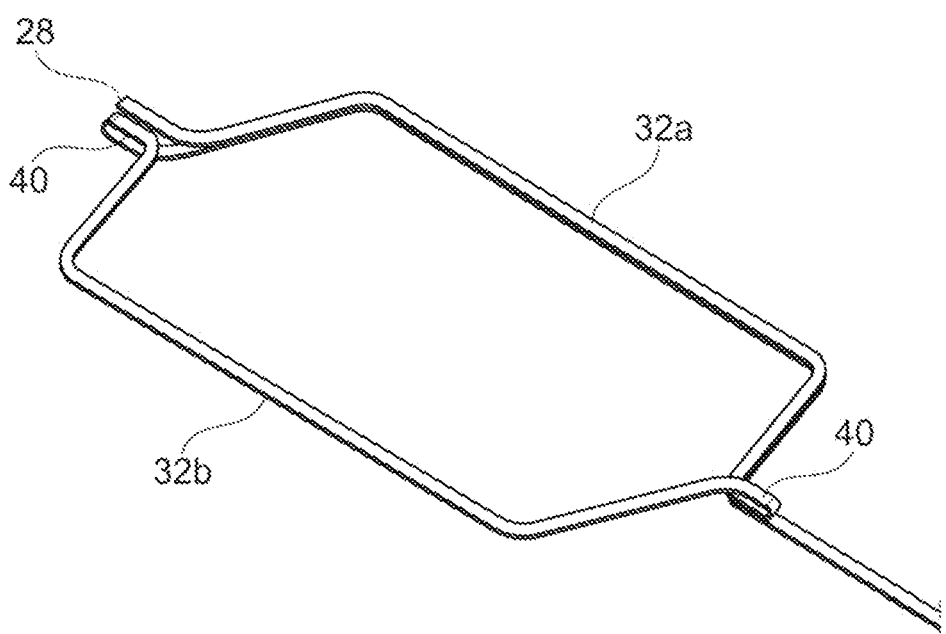
FIG. 15 shows the winding obtained by the step shown in FIG. 14.

The first and second half-turns 32a and 32b are then folded over one another, as is shown in FIGS. 13 to 15.

To do this, in a first folding step, the first half-turn 32a shaped at the first step above is folded on the second half-turn 32b shaped at the second step at the rectilinear portion, by rotation about an axis Y1 perpendicular to the axis X, as shown in FIG. 13. The first half-turn 32a and the second half-turn then form a complete turn and the rectilinear portion is in the form of a loop portion 40.

Then, in a second folding step, the complete coil formed is itself folded on the adjacent first half-turn 32a formed in the third step at the rectilinear portion between the second half-turn 32b shaped at the second step and the first half-turn 32a shaped in the third step, by rotation about an axis Y2 perpendicular to the axis X, as is shown in FIG. 14. The complete turn and the first half-turn then form a coil of one and a half-turn and the rectilinear portion forms a loop portion 40, as shown in FIG. 15.

In a third folding step, the previously formed winding is itself folded on the adjacent half-turn at the rectilinear portion between the half-turn adjacent to the winding and the preceding half-turn by rotating about an axis Yi perpendicular to the axis X, the rectilinear portion folding over the loop portion 40 formed during the first folding step, and thus until the winding is folded onto the last half-turn 32a or 32b, preferably 32b, of the coil 20, the rectilinear portions folding over one another.

The above folding steps are always done in the same direction so that the rectilinear portions are wound on one another at each coil end of the coil.

As a variant, the above folding steps are performed between the above shaping operations. The step of folding onto a half-turn 32a or 32b is carried out after its shaping. For example, the operations are carried out in the following order:

first and second operations of shaping/first step of folding/third operation of shaping/second step of folding/alternating operations of folding and steps of folding, or first and second operations of shaping/first step of folding/third and fourth operations of shaping/second and third steps of folding/alternating two operations of shaping and two steps of folding.

Figure 16:
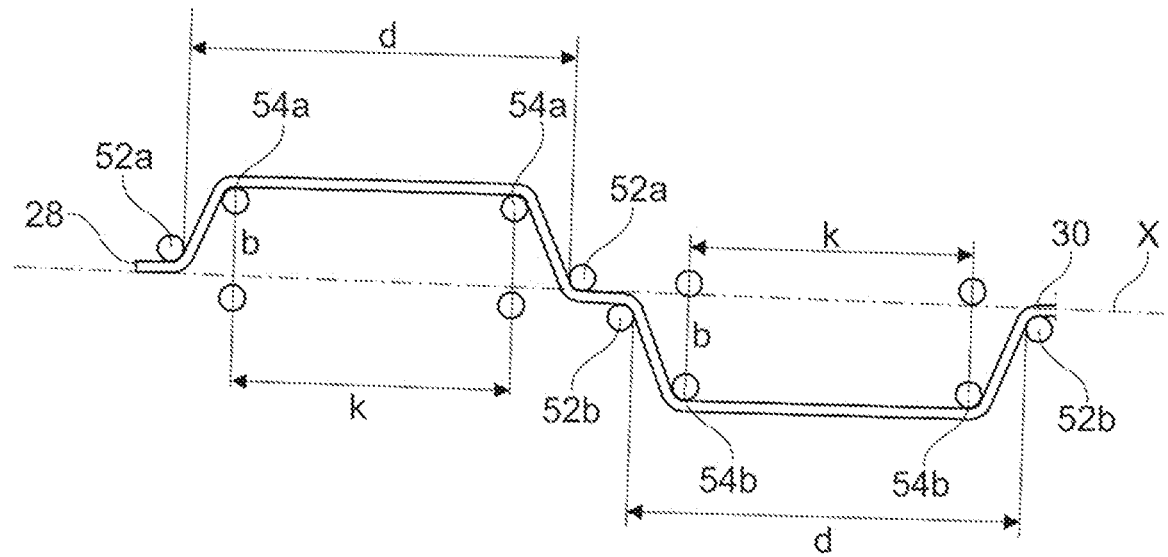
FIG. 16 schematically shows a variant of shaping by a forming system of the first and second half-turns.
Figure 17:
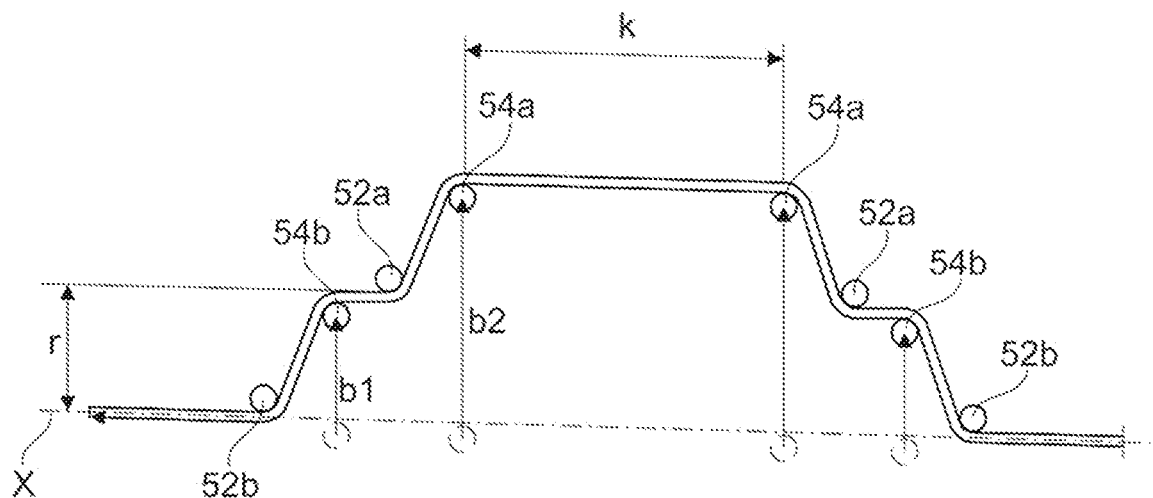
FIG. 17 schematically shows a variant of shaping by a forming system of the first and second half-turns.

In the variant shown in FIGS. 16 and 17, the forming system 50 is different.

In the embodiment of FIG. 16, the forming system 50 makes it possible to shape in a single shaping operation a first and a second half-turn 32a and 32b along the axis X. It comprises along this axis X:

a first set of rollers comprising two rollers with fixed axes 52a on one side of the axis X and two rollers with movable axes 54a arranged between the rollers 52a on the other side of the axis X relative to the rollers 52a, the rollers 54a being movable towards the rollers 52a perpendicular to the axis X, and a second set of rollers comprising two rollers with fixed axes 52b on the side of the axis X opposite the rollers 52a of the first winding and two rollers of movable axes 54b arranged between the rollers 52b on the same side of the axis X as the rollers 52a of the first winding, the rollers 54b being movable towards the rollers 52b perpendicular to the axis X. The rollers 52a and 52b of each set of rollers are spaced apart by a distance d substantially equal to the length S of the first and second half-turns 32a and 32b respectively. The rollers 54a and 54b are spaced apart by a distance k, between their axes, substantially equal to the length m of the respective main portions 32a and 32b of the first and second half-turns.

According to a first shaping operation, shown in FIG. 16, a first rectilinear part of the conducting wire 30 is positioned along the axis X between the rollers 52a and 52b and the rollers 54a and 54b. Then, the rollers 54a and 54b are moved in the direction of the rollers 52a and 52b by a distance b substantially equal to the width Q of the first and second half-turns 32a and 32b. The rollers 54a and 54b deform the conducting wire 30 during their movement, giving it the shape of a succession of a first half-turn 32a shaped by the first set of rollers and a second half-turn 32b shaped by the second set of rollers. This operation can be repeated as many times as there are turns on successive parts of the conducting wire 30. The folding steps are identical to those described previously.

In the embodiment of FIG. 17, the axis X extends along the main portion of the second half-turns 32b and the forming system 50 makes it possible to shape in a single operation half of the second half-turn 32b, a first half-turn 32a and half of the second half-turn along the axis X. The forming system comprises along the axis X:

two rollers with fixed axes 52b on one side of the axis X,
two movable axis rollers 54b arranged between the rollers 52b, on the other side of the axis X relative to the rollers 52b,
two rollers with fixed axes 52a arranged, protruding on the axis X, between the rollers 54b, on the side of the rollers 52b and spaced apart from the axis X transversely thereto by a distance r substantially equal to the width Q of the second half-turns 32b, and
two rollers with movable axes 54a arranged, in projection on the axis X, between the rollers 52a and on the side of the rollers 54b.

The rollers 54a are spaced apart by a distance k between their axes, substantially equal to the length m-S of the intermediate portion of the first half-turns 32a. The rollers 52a are spaced apart from the adjacent roller 54a along the axis X by a distance substantially equal to the length S-m along the axis X of the portion of coil end 36a of the first half-turns 32a. The rollers 54b are spaced apart from the adjacent fixed roller 52a along the axis X by a distance substantially equal to the length m-S of the main portion of the second half-turns 32b.

According to a first shaping operation, shown in FIG. 17, a first rectilinear part of the conducting wire 30 is positioned along the axis X between the rollers 52a and 52b and the rollers 54a and 54b. Then, the rollers 54b are moved from a first position in the direction of the rollers 52a, perpendicularly to the axis X, by a distance b1 substantially equal to the width Q of the second half-turns 32b, in a second position, and the rollers 54a are moved from a first position in the direction of the rollers 52a perpendicular to the axis X by a distance b2 substantially equal to the total width of the coil 20 in a second position. The rollers 54a and 54b deform the conducting wire during their movement, giving it the shape of a succession of patterns composed of one half of the second half-turn 32b, of a first half-turn 32a and of one half of the second half-turn along the axis X, as shown in FIG. 17.

This operation is repeated and the halves of adjacent second half-turns complement each other to form a second complete half-turn. The folding steps are identical to those described previously.

Figure 18:
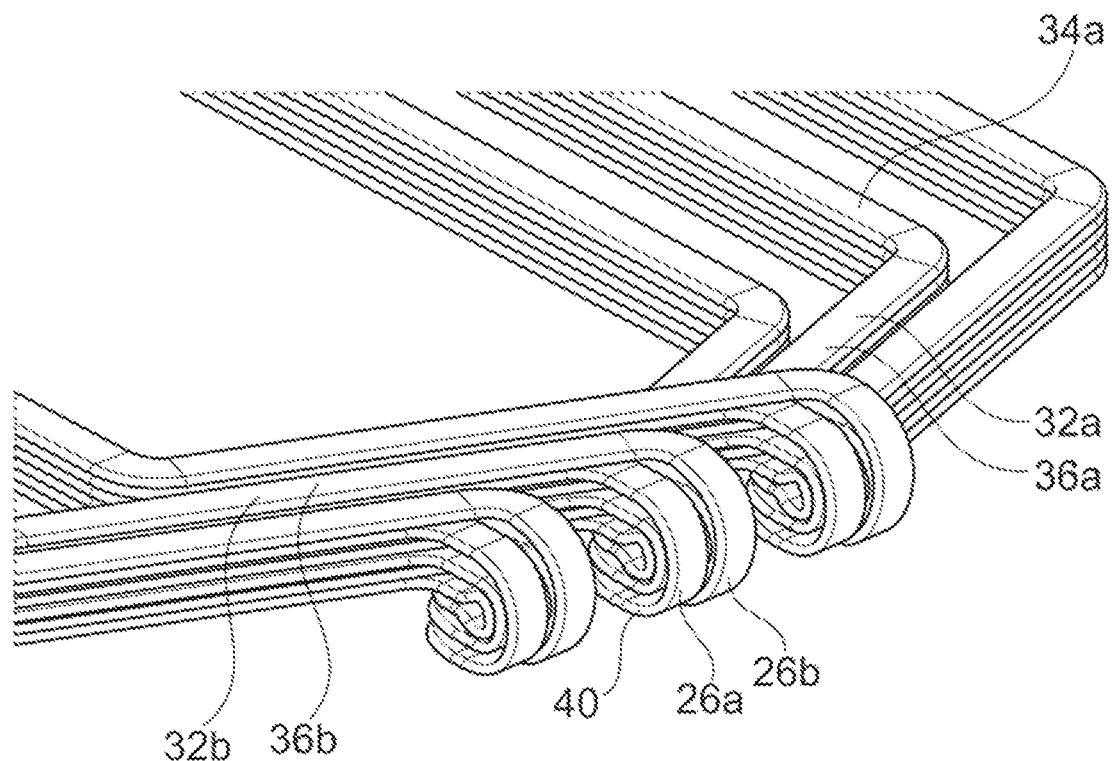
FIG. 18 schematically shows in perspective a variant arrangement of the coil ends of the coils.
Figure 19:
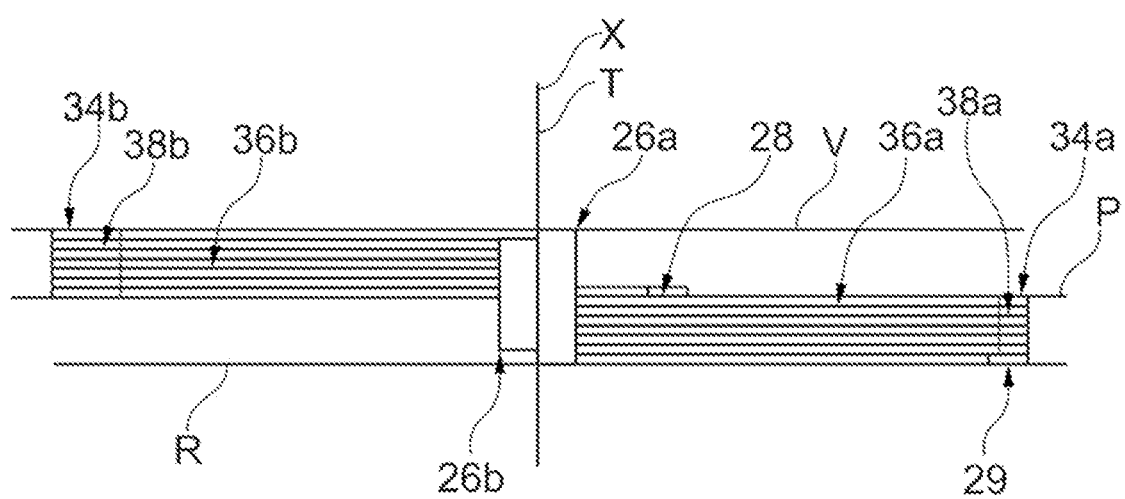
FIG. 19 schematically shows a variant of a coil before bending.
Figure 20:
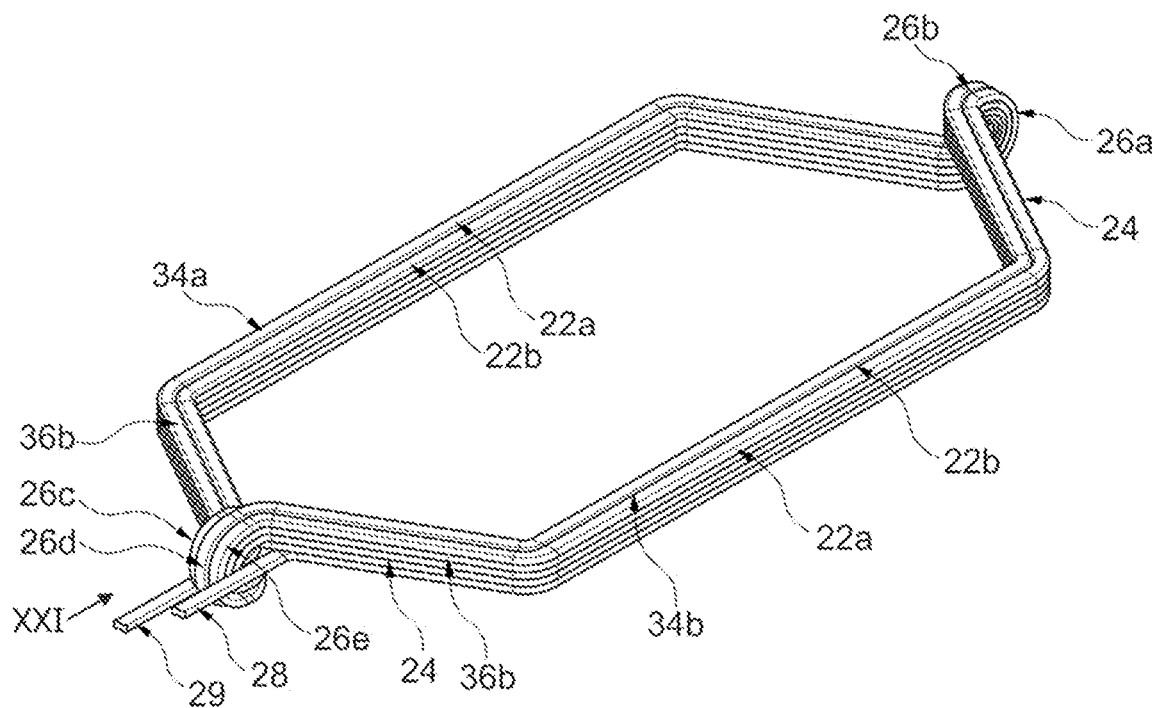
FIG. 20 schematically shows in perspective a variant of a coil before bending.

In the variant shown in FIGS. 18 and 19, the rectilinear portions fold alternately over two superposition zones to form two juxtaposed head end heads 26a and 26b. Such an arrangement with two head heads 26a and 26b formed by the superposition of one junction portion 40 on two makes it possible in particular to reduce the size of the coil ends in the transverse plane T, the latter not extending transversely over a width greater than the thickness of the coil, as is particularly visible in FIG. 19. The coil is then entirely included, before bending, between the planes V and R before bending of the coil defined by the outermost flat faces of the outermost first and second slot portions 32a and 32b of the coil 20, as can be seen in FIG. 19. The planes V and R become external cylinders after the bending of the coil. The embodiment of FIGS. to 25 differs from the preceding embodiments in that the first and second slot portions 34a and 34b are stacked on the flat face of the conducting wire in two juxtaposed columns 22a and 22b and in contact with one another by the edge of the conducting wire.

On one side of the slot portions 34a and 34b, the coil end 24 comprises two coil heads 26a and 26b, one 26a connecting the first slot portions 34a of the inner column 22b to the second slot portions 34b of the outer column 22b and the other connecting the first slot portions 34a of the outer column 22a to the second slot portions 34b of the inner column 22a. On the other side of the slot portions 34a and 34b, the coil end 24 comprises three head end heads 26c, 26d and 26e, the first slot portions 34a of the inner column 22b being connected alternately to the second slot portions 34b of the outer column 22a and of the inner column 22b by means of the junction portions respectively of the central head 26d and of the head 26e on the side of which the second half-turns extend and the first slot portions 34a of the outer column 22b being connected alternately to the second slot portions 34b of the outer column 22a and of the inner column 22b by means of the junction portions respectively of the central head 26d and of the head 26b on the side of which the first half-turns extend.

In this embodiment, the connection ends 28 and 29 are on either side of the three coil end heads 26c, 26d and 26e.

Figure 21:
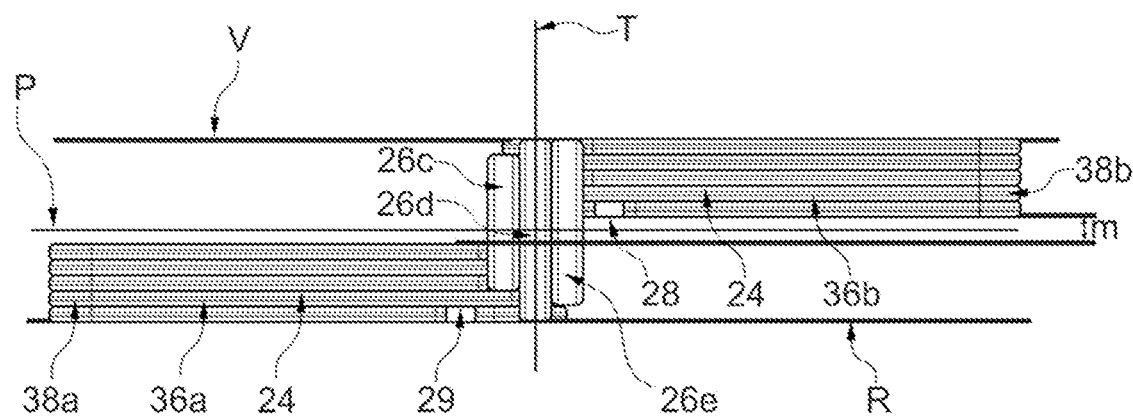
FIG. 21 shows the coil of FIG. 20 along XXI.
Figure 22:
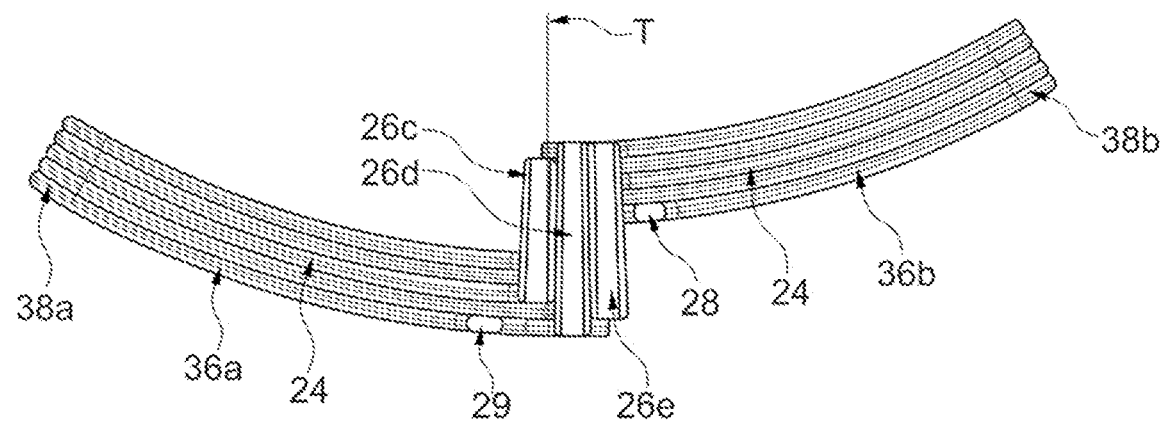
FIG. 22 corresponds to the coil of FIG. 21 after bending.

As can be seen in FIG. 21, the innermost first and second turns 32a and 32b can be distant from one another transversely to the median plane P of the coil by a zero or non-zero distance m, in particular such that the first and second half-turns 32a and 32b are connected together by a junction portion forming a loop portion extending over 180° with the smallest possible radius of curvature without damaging the conducting wire.

Figure 23:
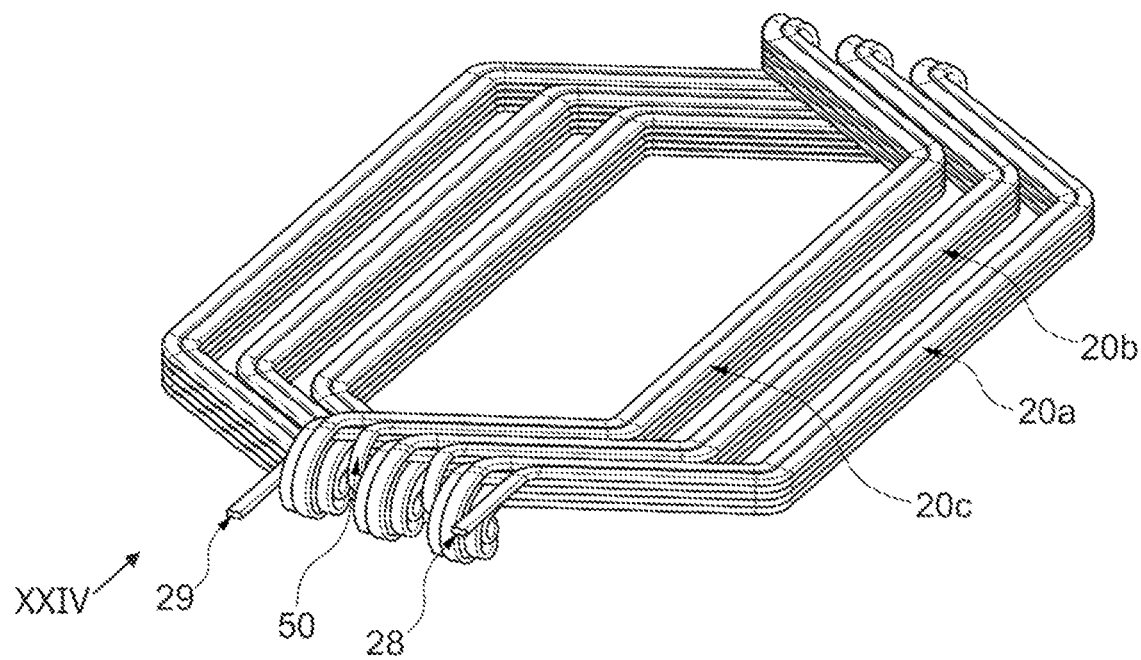
FIG. 23 shows a coil cluster of FIG. 20.
Figure 24:
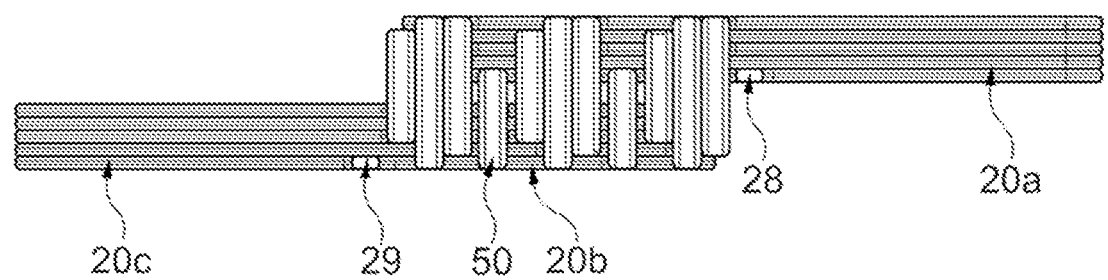
FIG. 24 is a view along XXIV of FIG. 23.
Figure 25:
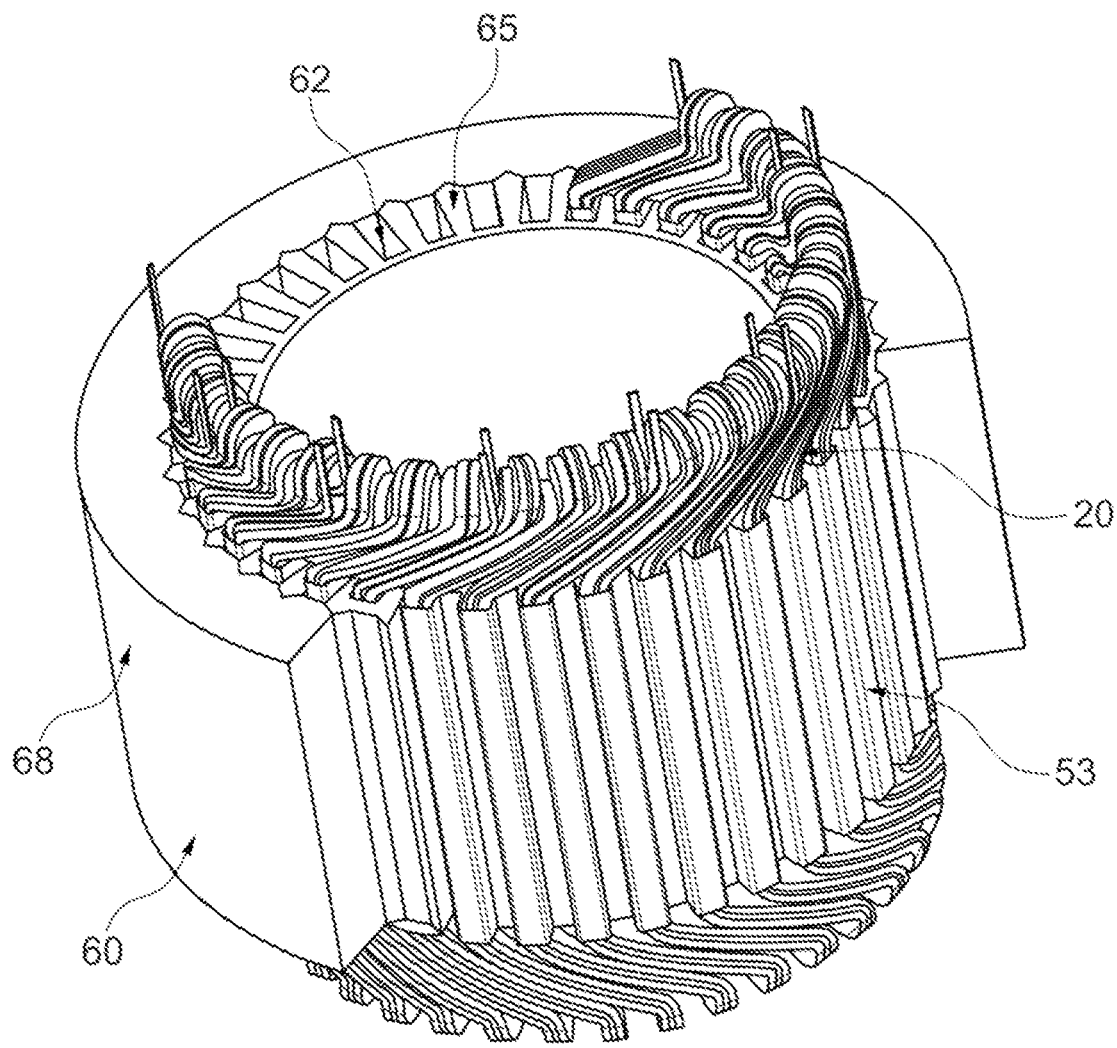
FIG. 25 shows an example of a stator.

As can be seen in FIGS. 23 and 24, once a coil 20a has been wound, the conducting wire can still be wound to form other coils 20b and 20c, the different coils 20b and 20c being attached together by continuity of the conducting wire. In the example shown, the set of these coils 20a, 20b and 20c formed from the same wire are configured to fit into slots of the adjacent stator, as is shown in FIG. 25. They are nested on one another and form a cluster of adjacent coils. The ends 28 and 29 of the conducting wire preferably extend on either side of the coil heads of the same coil end. The portions of the electrical wire allowing the junction between the different coils 50 are preferably in the form of a loop extending parallel to the loops of the coil heads between them, without transversely exceeding the latter.

The coils 20 as shown can be inserted in the slots 62 of any stator 60 having open slots 62. In the example shown in FIGS. 1B and 25, the stator 60 comprises a ring 65 wherein the slots 62 are produced, opening outwards, and a yoke 68 attached to the ring 65 allowing the slots 62 to be closed radially after insertion of the winding. The slots 62 are formed between teeth connected to one another by material bridges forming the bottom of the slots 62. The material bridges forming the bottom of the slots may be deformable. The ring 65 can be a single block as shown in FIG. 1B or in several sectors, not shown.

The yoke 68 can comprise reliefs complementary to reliefs of the ring 65 making it possible to facilitate the assembly. The reliefs are for example tenons and mortises or slots and complementary grooves.

The straight portions 22 of the coils intended to be inserted in the slots 62 of the stator 60 can be covered with a sheet insulator 53 making it possible to isolate them from the inside of the slot and from each other.

The method may comprise an additional step of separating the straight portions 22 of the coils 20 relative to one another. Such a spacing makes it possible to open the loop portion(s) in the coil ends 24. This makes it possible to reduce the form factor of the coil, in particular the coil ends 24, to facilitate their cooling and to reduce the length of wire necessary for the manufacture of each coil.

The method may also comprise an additional step of crushing the coil heads 26 making it possible to incline them relative to the transverse plane T.

Figure 26:
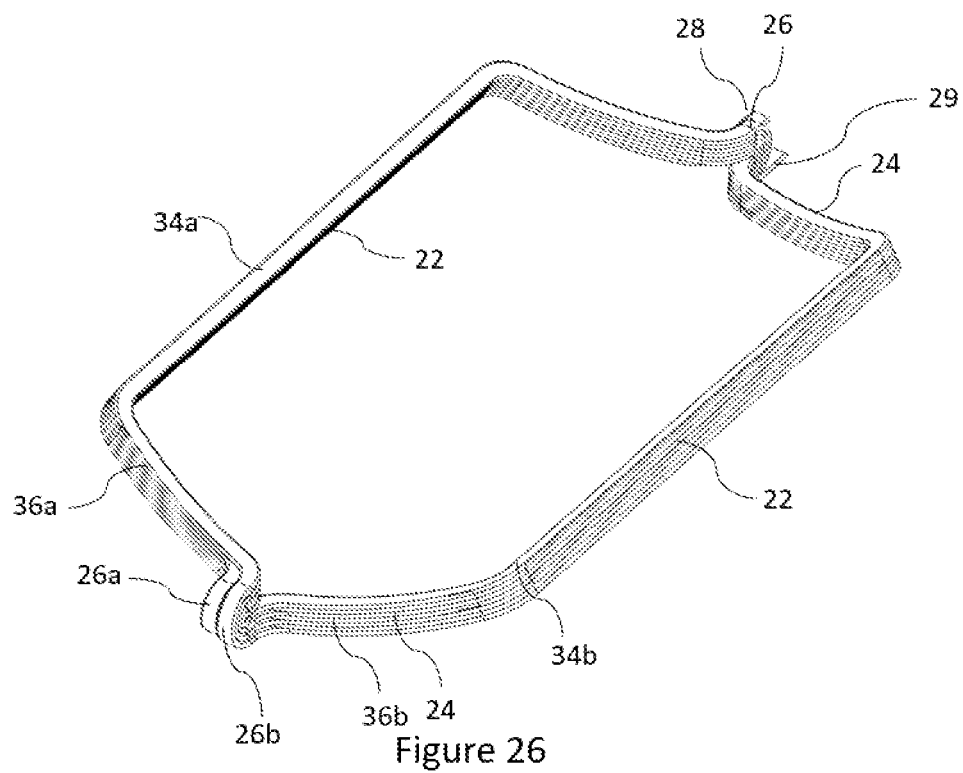
FIG. 26 schematically shows in perspective a variant of a coil.

In the variant of FIG. 26, the coil 20 has straight portions 22 in a single column. On one side of the straight portions 22, the coil has the two ends 28 and 29 and a single coil end head 26. On the other side of the straight portions 22, the coil has two coil end heads 26a and 26b on which the portions of junctions bend alternately. The innermost first and second turns 32a and 32b both have a surface extending along the median plane P of the coil.

Figure 27:
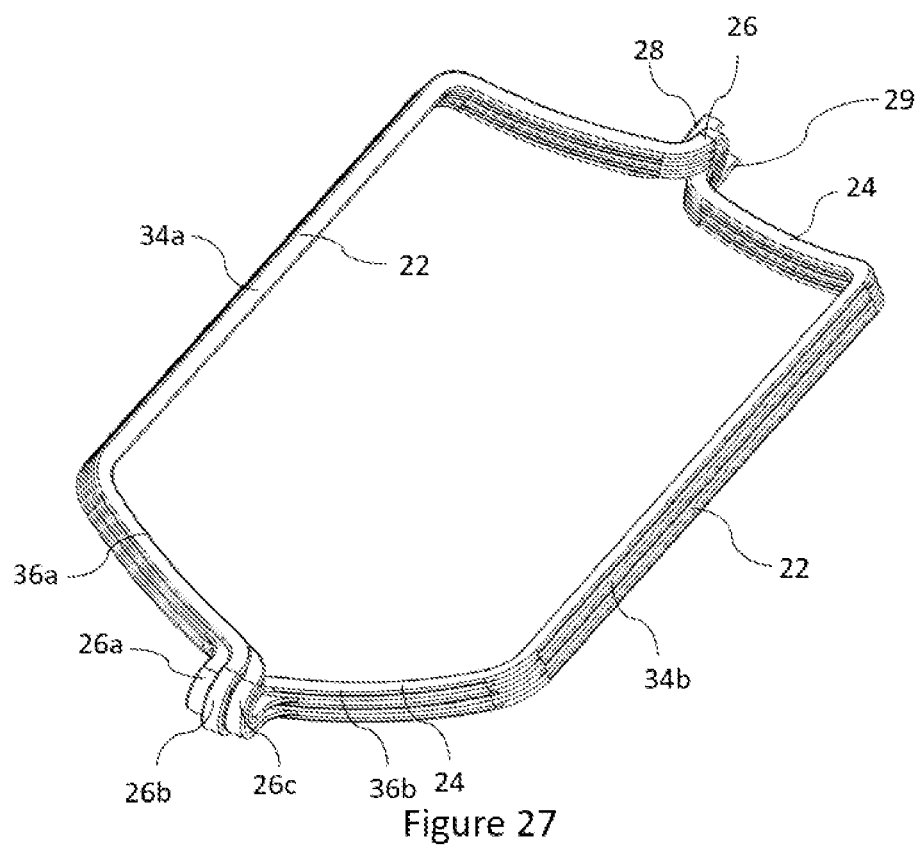
FIG. 27 schematically shows in perspective a variant of a coil.

The variant of FIG. 27 differs from that of FIG. 26 in that the coil has three coil heads 26a to 26c on which the junction portions bend alternately. The innermost first and second turns 32a and 32b are separated from one another transversely to the median plane P of the coil by a distance m of zero.

Figure 28:
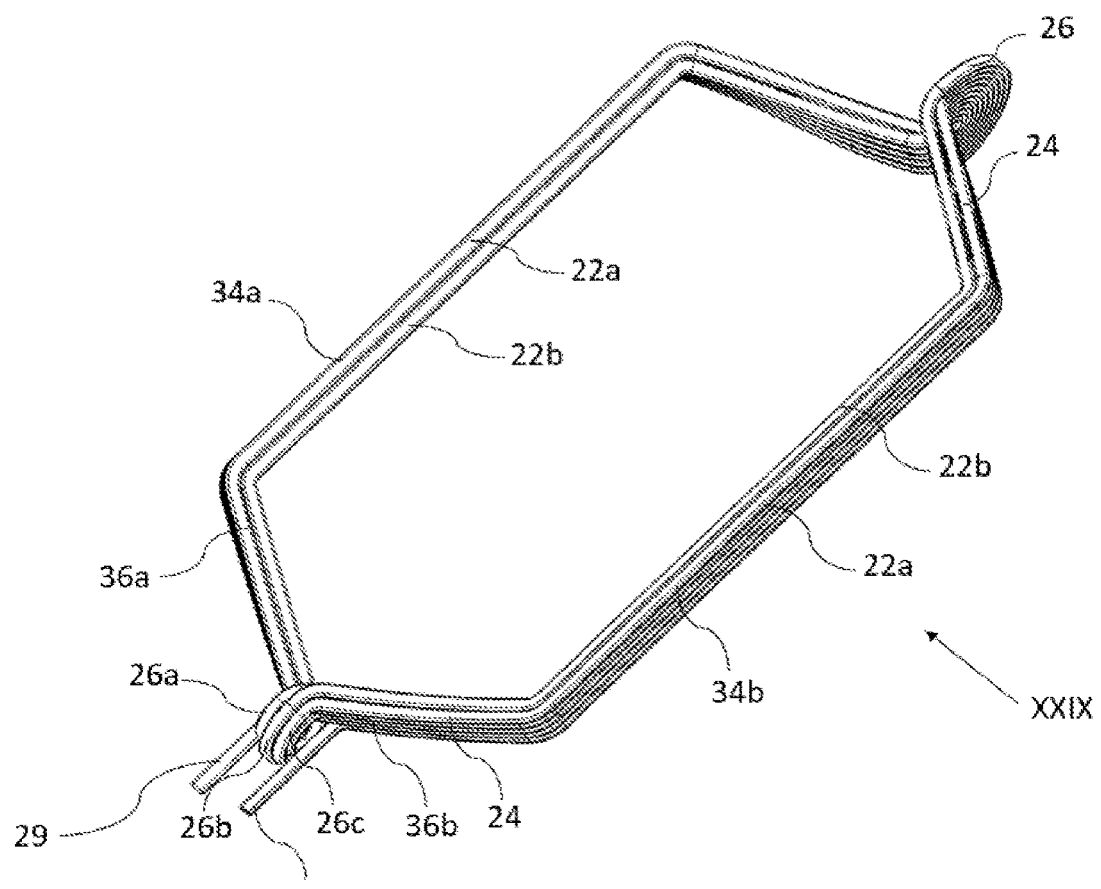
FIG. 28 schematically shows in perspective a variant of a coil.
Figure 29:
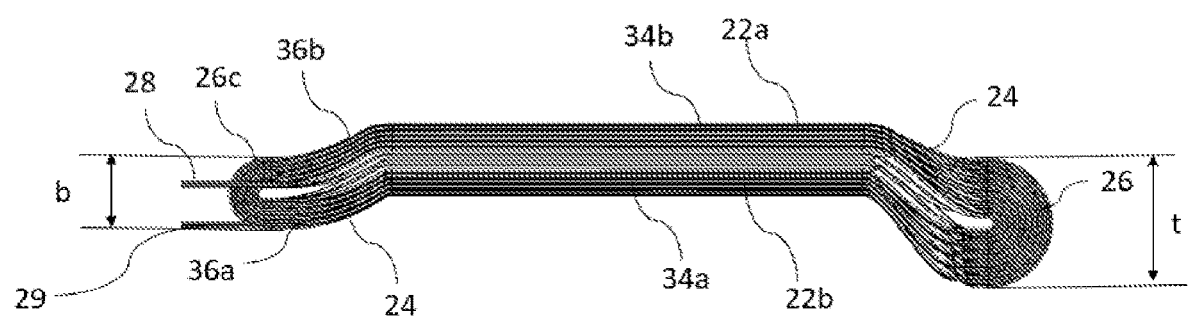
FIG. 29 is a view along XXIX of FIG. 28.

In the variant of FIGS. 28 and 29, the coil 20 has straight portions 22 in two columns 22a and 22b. On one side of the straight portions 22, the coil has a single coil end head 26. On the other side of the straight portions 22, the coil has two ends 28 and 29 and three coil end heads 26a to 26c on which the portions of junctions bend alternately. The innermost first and second turns 32a and 32b can be separated from one another transversely to the median plane P of the coil by a zero or non-zero distance m.

The coil end head 26 has a transverse form factor t much larger than that of the coil b on the side of the three coil end heads 26a to 26c. Such a form factor prevents the insertion of the yoke from the single coil end head. However, the yoke can be inserted on the other side.

Figure 30:
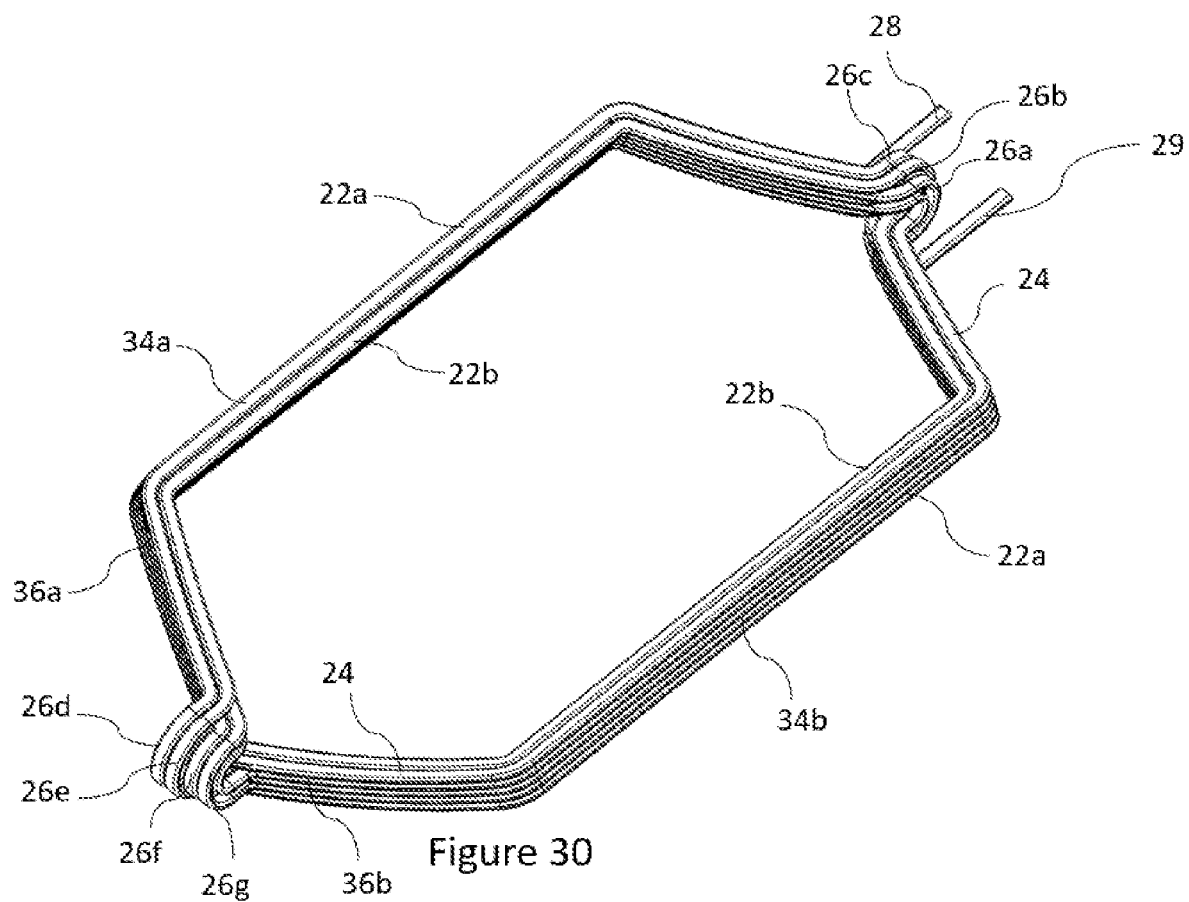
FIG. 30 schematically shows in perspective a variant of a coil.

In the variant of FIG. 30, the coil 20 has straight portions 22 in two columns 22a and 22b. On one side of the straight portions 22, the coil has two ends 28 and 29 and three coil end heads 26a to 26c on which the portions of junctions bend alternately. On the other side of the straight portions 22, the coil has four coil end heads 26d and 26g on which the portions of junctions bend alternately. The innermost first and second turns 32a and 32b can be separated from one another transversely to the median plane P of the coil by a zero or non-zero distance m.

The machines and methods disclosed herein are not limited to the examples that have been described above.

For example, the first and second half-turns can take different shapes, the coil clusters can be made with first and second slot portions in a single column and with one or more coil heads, the central spacing of the first and second half-turns can be present on a coil whose first and second slot portions are in a single column.

The invention claimed is:

1. A coil intended to be bent to be inserted in a first and a second slot of a stator of a rotating electrical machine, the coil being wound in a plurality of successive turns, each coil comprising:
    a first half-turn comprising a first slot portion configured to be inserted into the first slot of the stator,
    a second half-turn comprising a second slot portion configured to be inserted into the second slot of the stator,
    the first slot portions being stacked in one or more columns each configured to extend radially into the first slot of the stator, and the second slot portions being stacked in a same number of columns each configured to extend radially into the second slot of the stator,
    the first slot portions and the second slot portions being stacked in an identical order starting from a median plane of the coil toward the external planes,
    the second half-turns each being connected to the first half-turn of the same turn and to the first half-turn of the next turn by junction portions, the junction portions extending from one of the sides of the first and second slot portions stacked in a number of juxtaposed heads, strictly greater than the number of columns of the first and second slot portions.

2. The coil according to claim 1, wherein the number of columns is greater than or equal to 1.

3. The coil according to claim 1, wherein the number of columns is greater than or equal to 2 and the first slot portions and second slot portions of successive turns are stacked alternately on the corresponding different columns.

4. The coil according to claim 1, wherein the number of heads on which the junction portions on said side of the slot portions are stacked is equal to the number of columns plus one.

5. A coil intended to be inserted in a first and a second slot of a stator of a rotating electrical machine, the coil being wound in a plurality of successive turns, each coil comprising:
    a first half-turn comprising a first slot portion configured to be inserted into the first slot of the stator,
    a second half-turn comprising a second slot portion configured to be inserted into the second slot of the stator,
    the second half-turns are each connected to the first half-turn of the same turn and to the first half-turn of the next turn by junction portions,
    on each side of the first and second slot portions, the junction portions of the coil are stacked in at least two juxtaposed heads extending according to junction planes parallel to one another, the junction portions are superposed alternately on one and the other of the two heads.

6. The coil according to claim 1, wherein the innermost first and second slot portions of the coil have their innermost surfaces extending along a same median plane of the coil.

7. The coil according to claim 1, wherein the coil is entirely comprised between two parallel external planes to the median plane of the coil and defined by the surfaces of the outermost first and second slot portions of the coil furthest from the median plane of the coil.

8. The coil according to claim 1, wherein the junction portions are superposed on one another on the flat face of the conducting wire alternately on one and the other of the two heads.

9. The coil according to claim 1, wherein the coil is formed from one or more conducting wires the one or more conducting wires being, in transverse section, of rectangular shape, the first half-turns being in contact with each other by their flat faces and the second half-turns being in contact with each other by their flat faces.

10. The coil according to claim 1, wherein the first and second half-turns each extend along a half-turn plane, the half-turn planes of the first and second half-turns being parallel to one another and parallel to the median plane of the coil.

11. The coil according to claim 10, wherein the half-turn planes of the first half-turns all extend on the same side of the median plane of the coil and the half-turn planes of the second half-turns all extend from the other side of the median plane of the coil.

12. The coil according to claim 1, wherein the coil is of substantially hexagonal shape.

13. The coil according to claim 1, wherein each junction portion is a loop portion extending between the first and second half-turns that it connects.

14. The coil according to claim 1, wherein the innermost junction portion of the coil forms a substantially complete loop.

15. The coil according to claim 1, wherein, on each side of the first and second slot portions, the junction portions of the coil are stacked in at least two juxtaposed heads extending along junction planes parallel to one another, the junction portions being superposed between them.

16. The coil according to claim 15, wherein the two junction planes are laterally offset between them by a distance substantially equal to the width of the flat face of the conducting wire so that the two adjacent heads are laterally contiguous.

17. The coil according to claim 1, wherein the first slot portions are superposed in several, columns juxtaposed perpendicularly to the median plane, and the second slot portions are also superposed in several columns juxtaposed perpendicularly to the median plane.

18. The coil according to claim 17, wherein the junction portions on one side of the slot portions are stacked in as many heads as there are juxtaposed columns of the junction portions, and the junction portions of the other side of the first and second slot portions are stacked according to a number of juxtaposed heads corresponding to the number of columns of the slot portions plus one, the heads extending along junction planes parallel to one another.

19. A method of manufacturing the coil according to claim 1 for a rotating electrical machine, comprising the steps of:
 (a) shaping at least one conducting wire using a forming system to form an alternation, along the conducting wire, of at least one first half-turn and at least one second half-turn,
 (b) folding the first and second half-turns on one another starting from a first end of the conducting wire to a second end of the conducting wire, to form a winding forming at least one turn.

* * * * *